United States Patent
Tokutsu et al.

(10) Patent No.: US 9,961,005 B2
(45) Date of Patent: May 1, 2018

(54) BUS SYSTEM AND COMPUTER PROGRAM

(71) Applicant: Panasonic Intellectual Property Management Co., Ltd., Osaka (JP)

(72) Inventors: Satoru Tokutsu, Saitama (JP); Tomoki Ishii, Kyoto (JP); Atsushi Yoshida, Osaka (JP); Takao Yamaguchi, Osaka (JP); Nobuyuki Ichiguchi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 377 days.

(21) Appl. No.: 14/641,223

(22) Filed: Mar. 6, 2015

(65) Prior Publication Data
US 2015/0180784 A1  Jun. 25, 2015

Related U.S. Application Data

(63) Continuation of application No. PCT/JP2014/001337, filed on Mar. 10, 2014.

(30) Foreign Application Priority Data

Mar. 12, 2013  (JP) ................................. 2013-049472

(51) Int. Cl.
*H04L 12/833* (2013.01)
*H04L 12/40* (2006.01)
*H04L 12/46* (2006.01)
*H04L 12/947* (2013.01)

(52) U.S. Cl.
CPC ...... *H04L 47/2458* (2013.01); *H04L 12/4015* (2013.01); *H04L 12/4625* (2013.01); *H04L 49/252* (2013.01)

(58) Field of Classification Search
CPC ............... H04L 47/2458; H04L 49/252; H04L 12/4015; H04L 12/4625
See application file for complete search history.

(56) References Cited

U.S. PATENT DOCUMENTS

2002/0141403 A1* 10/2002 Akahane ................. H04L 45/00
  370/389
2006/0209846 A1* 9/2006 Clermidy ................ H04L 12/56
  370/400

(Continued)

FOREIGN PATENT DOCUMENTS

JP  07-312764 A  11/1995
JP  2001-160830 A  6/2001

(Continued)

OTHER PUBLICATIONS

Extended European Search Report for corresponding European Application No. 14763811.8 dated Oct. 4, 2016.

(Continued)

*Primary Examiner* — Hassan Kizou
*Assistant Examiner* — Hector Reyes Ortiz
(74) *Attorney, Agent, or Firm* — Renner, Otto, Boisselle & Sklar, LLP

(57) ABSTRACT

A bus system (100) for a semiconductor circuit transmits data on a networked bus between a first node and at least one second node via a relay device (250) arranged on the bus. The bus system (100) includes a first bus of a low delay and a second bus of a high delay. The first node generates a plurality of packets by attaching, to the data stored in a buffer (202), information specifying a priority of transmission. The relay device (250) converts a priority based on a priority conversion rule, which is determined based on a transmission delay of the high-delay bus, allocates a buffer of a destination relay device to which each packet is to be sent, based on the converted priority, and sends packets in a descending order. The relay device (250) stores packets in a buffer (252) based on the priority.

17 Claims, 41 Drawing Sheets

(56) References Cited

U.S. PATENT DOCUMENTS

| | | | |
|---|---|---|---|
| 2008/0239960 A1* | 10/2008 | Burckart | H04L 41/5022 370/235 |
| 2012/0044942 A1* | 2/2012 | Yamaguchi | G06F 13/1663 370/400 |
| 2012/0072635 A1 | 3/2012 | Yoshida et al. | |
| 2013/0142066 A1 | 6/2013 | Yamaguchi et al. | |
| 2013/0194927 A1 | 8/2013 | Yamaguchi et al. | |

FOREIGN PATENT DOCUMENTS

| | | |
|---|---|---|
| JP | 2003-224597 A | 8/2003 |
| JP | 2004-056328 A | 2/2004 |
| JP | 2004-104571 A | 4/2004 |
| JP | 2005-006050 A | 1/2005 |
| JP | 2005-295118 A | 10/2005 |
| JP | 2007-104677 A | 4/2007 |
| JP | 2008-092184 A | 4/2008 |
| WO | WO 2012/132264 A1 | 10/2012 |

OTHER PUBLICATIONS

International Search Report for corresponding International Application No. PCT/JP2014/001337 dated May 27, 2014.

Form PCT/ISA/237 for corresponding International Application No. PCT/JP2014/001337 dated May 27, 2014 and partial English translation.

* cited by examiner

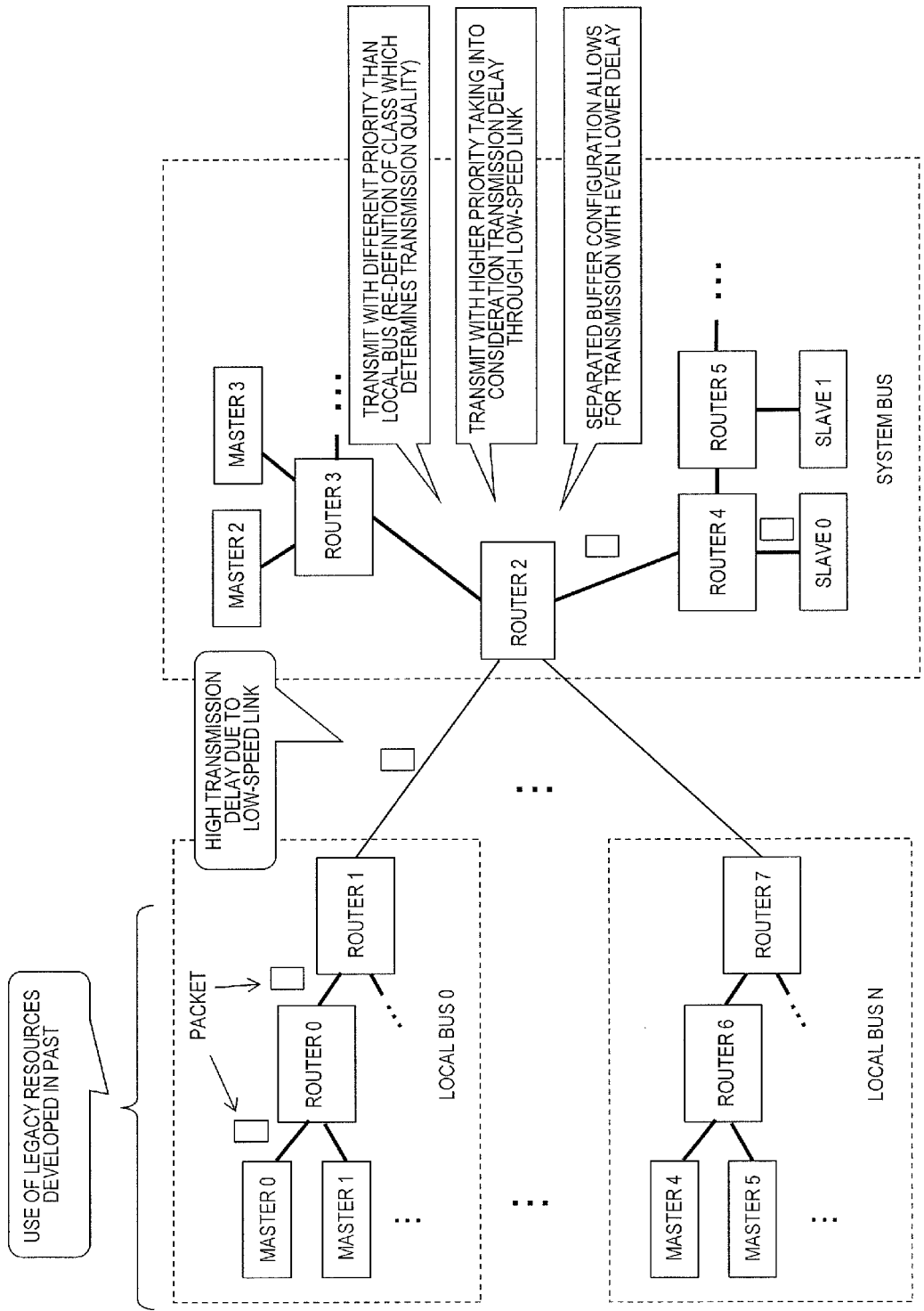

FIG.8

| MASTER ID | MASTER 0 |
|---|---|
| CLASS | CLASS B |
| ACCEPTABLE DELAY TIME | 3000 |

FIG.13

| MASTER ID | PASSING THROUGH LOW-SPEED LINK? | ORIGINAL CLASS | CONVERTED CLASS | OFFSET TIME FOR DEADLINE TIME |
|---|---|---|---|---|
| MASTER 0 | YES | CLASS B | CLASS A | 400 |
| MASTER 1 | YES | CLASS C | CLASS A | 400 |
| MASTER 2 | NO | CLASS B | CLASS B | 0 |
| MASTER 3 | NO | CLASS A | CLASS A | 0 |
| MASTER 4 | YES | CLASS C | CLASS A | 500 |
| MASTER 5 | YES | CLASS C | CLASS B | 500 |

FIG.15

| BUFFER ID | PASSING THROUGH LOW-SPEED LINK? | ORIGINAL CLASS | CONVERTED CLASS | OFFSET TIME FOR DEADLINE TIME |
|---|---|---|---|---|
| BUFFER 0 | YES | CLASS A | CLASS A | 450 |
| BUFFER 1 | YES | CLASS B | CLASS A | 450 |
| BUFFER 2 | YES | CLASS C | CLASS B | 450 |
| BUFFER 3 | NO | CLASS A | CLASS A | 0 |
| BUFFER 4 | NO | CLASS B | CLASS B | 0 |
| BUFFER 5 | NO | CLASS C | CLASS C | 0 |

FIG.17

| TRAFFIC FLOW ID | PASSING THROUGH LOW-SPEED LINK? | ORIGINAL CLASS | CONVERTED CLASS | OFFSET TIME FOR DEADLINE TIME |
|---|---|---|---|---|
| TRAFFIC FLOW 0 | YES | CLASS B | CLASS A | 400 |
| TRAFFIC FLOW 1 | YES | CLASS C | CLASS A | 400 |
| TRAFFIC FLOW 2 | YES | CLASS C | CLASS B | 400 |
| TRAFFIC FLOW 3 | NO | CLASS B | CLASS B | 0 |
| TRAFFIC FLOW 4 | NO | CLASS A | CLASS A | 0 |
| TRAFFIC FLOW 5 | NO | CLASS B | CLASS B | 0 |
| TRAFFIC FLOW 6 | YES | CLASS C | CLASS A | 500 |
| TRAFFIC FLOW 7 | YES | CLASS C | CLASS B | 500 |
| TRAFFIC FLOW 8 | YES | CLASS C | CLASS A | 500 |

FIG.23

| START CODE | DESTI- NATION ID | MASTER ID | MASTER CLASS | DEAD- LINE TIME | CONVER- TED CLASS | CONVER- TED DEAD- LINE TIME | STORAGE BUFFER ID | ACCESS DATA | END CODE |

FIG.24A

| START CODE | DESTI-NATION ID | MASTER ID | CLASS | DEAD-LINE TIME | CONVER-TED CLASS | CONVER-TED DEAD-LINE TIME | STORAGE BUFFER NUMBER | ACCESS DATA | END CODE |
|---|---|---|---|---|---|---|---|---|---|
| | (0) | (0) | (B) | (500) | (A) | (100) | | | |

FIG.24B

| START CODE | DESTI-NATION ID | MASTER ID | CLASS | DEAD-LINE TIME | CONVER-TED CLASS | CONVER-TED DEAD-LINE TIME | STORAGE BUFFER NUMBER | ACCESS DATA | END CODE |
|---|---|---|---|---|---|---|---|---|---|
| | (0) | (1) | (C) | (700) | (A) | (300) | | | |

FIG.24C

| START CODE | DESTI-NATION ID | MASTER ID | CLASS | DEAD-LINE TIME | CONVER-TED CLASS | CONVER-TED DEAD-LINE TIME | STORAGE BUFFER NUMBER | ACCESS DATA | END CODE |
|---|---|---|---|---|---|---|---|---|---|
| | (0) | (2) | (B) | (550) | (B) | (550) | | | |

FIG.26

| | |
|---|---|
| MASTER ID | MASTER 0 |
| CLASS | CLASS B |
| ACCEPTABLE DELAY TIME | 3000 |
| CONVERTED CLASS | CLASS A |
| CONVERTED ACCEPTABLE DELAY TIME | 2600 |

*FIG.36*

| MASTER ID | PASSING THROUGH LOW-SPEED LINK? | ORIGINAL CLASS | CONVERTED CLASS | OFFSET TIME FOR DEADLINE TIME |
|---|---|---|---|---|
| MASTER 0 | YES | CLASS B | CLASS B | 0 |
| MASTER 1 | YES | CLASS C | CLASS C | 0 |
| MASTER 2 | NO | CLASS B | CLASS C | -450 |
| MASTER 3 | NO | CLASS A | CLASS B | -450 |
| MASTER 4 | YES | CLASS C | CLASS C | 0 |
| MASTER 5 | YES | CLASS C | CLASS C | 0 |

*FIG.41*

| MASTER ID | UNCONVERTED CLASS | CONVERTED CLASS |
|---|---|---|
| MASTER 0 | CLASS A | CLASS A |
| MASTER 1 | CLASS A | CLASS B |
| MASTER 2 | CLASS B | CLASS C |
| MASTER 3 | CLASS B | CLASS D |
| MASTER 4 | CLASS C | CLASS E |
| MASTER 5 | CLASS C | CLASS E |

*FIG.42*

| MASTER ID | SET SENDING INTERVAL | COUNTER VALUE FOR SENDING CONTROL | DIFFERENCE BETWEEN COUNTER VALUE AND SET SENDING INTERVAL | PRIORITY ORDER FOR SENDING (SMALLER VALUE MEANS HIGHER PRIORITY) |
|---|---|---|---|---|
| MASTER 0 | 10 | 2 | −8 | 2 |
| MASTER 1 | 10 | 12 | +2 | 1 |
| MASTER 2 | 100 | 25 | −75 | 3 |
| MASTER 3 | 100 | 50 | −50 | 4 |
| MASTER 4 | −1 (NON-GUARANTEED) | 100 | (DIFFERENCE NOT CALCULATED) | 6 |
| MASTER 5 | −1 (NON-GUARANTEED) | 120 | (DIFFERENCE NOT CALCULATED) | 5 |

CORRESPONDING TO GROUP 1 (Master 0, Master 1)

CORRESPONDING TO GROUP 2 (Master 2, Master 3, Master 4, Master 5)

BUS SYSTEM AND COMPUTER PROGRAM

This is a continuation of International Application No. PCT/JP2014/001337, with an international filing date of Mar. 10, 2014, which claims priority of Japanese Patent Application No. 2013-049472, filed on Mar. 12, 2013, the contents of which are hereby incorporated by reference.

BACKGROUND

1. Technical Field

The present disclosure relates to a technique for controlling communication buses in a bus system including networked communication buses (distributed buses) provided in a semiconductor integrated circuit.

2. Description of the Related Art

When developing a system having semiconductor circuits, there is a demand for reducing the cost of implementation/development by completing the system in a short amount of time by freely combining together a plurality of semiconductor circuits. For example, it is possible to develop a system at low cost by making modules of semiconductor circuits in the form of chips in advance so that one can utilize chips developed in the past as external chips (off-chips) for modules that do not need to be newly developed.

However, in order to efficiently utilize modules developed in the past, the bus system for connecting together semiconductor circuits and transmitting communication data therebetween needs to have a flexibility in settings (granularity of freedom in settings). A plurality of masters (nodes) are present in each module, and each master performs data communication with a different quality requirement with a slave such as a memory element. The "quality requirement" as used herein refers to the delay or the throughput to be guaranteed, for example.

NoC (Network-on-Chip) techniques, capable of reducing the number of buses, are used for bus systems for transmitting data communication traffic flows. With NoC, buses are connected via routers (relay devices). Since traffic flows having different quality requirements are transmitted sharing the same bus, the transmission is controlled while varying the manner of sending for each quality requirement. In order to ensure an optimal level of transmission performance (delay and throughput for the transmission) depending on the combination of masters, one needs to be able to flexibly set the manner of sending. Thus, with flexible bus systems having a plurality of settings variations, such as where settings are done for each module or settings are done for each master, it is possible to develop more efficiently. In order to combine a plurality of chips together, chips need to be connected together by low-speed buses with which all the chips are compatible. Therefore, it is necessary to make settings while taking into consideration significant transmission delays to be experienced when passing through the low-speed links. Note that a bus with a significant delay will be hereinafter referred to as a "low-speed link". A low-speed link may be determined relatively with respect to other buses, or may be determined as being a bus that does not satisfy required transmission performance. For example, a bus having a high delay is included as a low-speed link even if the bus's transmission quantity per unit time is large.

Japanese Laid-Open Patent Publication No. 2004-56328 discloses a conventional relay device. FIG. 1 shows a configuration of a conventional relay device.

The conventional relay device is provided with three types of buffers. The three types of buffers are dedicated buffers for storing traffic flows transmitted from Bus Masters A to C, respectively. The type of the traffic flow to be sent (the quality to be required) is determined for each of Bus Masters A to C. For example, they are the quality ensured type traffic flow (A), the best-effort low-delay type traffic flow (B), and the best-effort type traffic flow (C). The three types of buffers are provided for controlling the sending schedule while distinguishing these traffic flows from one another. Traffic flows, having arrived at Relay Device R, are once stored separately in the respective dedicated buffers. Note that traffic flows are transmitted in the form of packets.

The relay device controls the sending schedule of each packet according to the priority of the quality requirement of each traffic flow, and outputs the packet from the respective dedicated buffer according to the determined sending schedule. The arbiter of the relay device connects buffers to the output port preferentially in a descending order of the level of quality requirement of the buffers. In this manner, the sending schedule can be controlled according to the level of quality requirement of each traffic flow.

SUMMARY

With the conventional technique described above, however, there is a demand for further improving the transmission performance.

A non-limiting example embodiment of the present application provides a technique for a bus system having a high transmission performance and allowing for flexible settings.

In one general aspect, a bus system for a semiconductor circuit, in which data is transmitted on a networked bus between a first node and at least one second node via a relay device arranged on the bus, wherein: the bus system includes a first bus of a relatively low delay and a second bus of a relatively high delay; the first node includes: a buffer (first buffer) for storing data; and a packet generator for generating a plurality of packets by attaching, to the data stored in the buffer, information specifying a priority of transmission at the relay device; and the relay device includes: a priority converter for converting a priority of each of the plurality of packets based on a priority conversion rule for converting the priority, which is determined based on a transmission delay of the high-delay bus; a buffer allocator for allocating a buffer of a destination relay device to which the packet is to be sent, based on the converted priority; a sending controller for sending packets in a descending order of the priority; and a buffer (second buffer) for storing packets based on the priority, is provided.

With the bus system according to the above aspect, a plurality of semiconductor modules can be combined with one another in a flexible manner while the priority of transmission at relay devices of the bus system can be changed, keeping a high level of transmission performance. For example, where a plurality of chips are connected together, a traffic flow to merge with others can be transmitted with an optimal level of transmission performance (delay and throughput of transmission) for each chip, irrespective of the chip combination variation. It is also possible to change the priority while taking into consideration of the delay on the transmission path of the off-chip bus. The provision of variations of flexible settings makes it possible to adjust the amount by which chips are changed while maintaining a high level of transmission performance, thereby enabling development of semiconductor devices at a lower cost.

The general and particular embodiment set forth above can be implemented by using a system, a method and a computer program, or by using a combination of a system, a method and a computer program.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 4 shows a process policy in an example embodiment.

FIG. 8 shows a configuration example of information stored in a master information storage 205.

FIG. 13 shows a priority conversion rule stored in a storage 256.

FIG. 15 shows a priority conversion rule to be stored in the priority conversion rule storage where buffer IDs are used.

FIG. 17 shows a priority conversion rule to be stored in the priority conversion rule storage where traffic flow IDs are used.

FIG. 23 shows an example configuration of a packet to which the converted priority is attached.

FIGS. 24A to 24C show examples configured with information obtained from actual masters, in contrast with the packet configuration shown in FIG. 23.

FIG. 26 shows a configuration of a master information storage for generating a packet to which the converted priority is attached.

FIG. 36 shows a priority conversion rule in a case where the priority of a packet that does not pass through a low-speed link is set low.

FIG. 41 shows a priority conversion rule stored in a priority conversion rule storage 404.

FIG. 42 shows the sending rate for each master managed by a rate manager 406.

DETAILED DESCRIPTION

The relay device of Japanese Laid-Open Patent Publication No. 2004-56328 controls the sending schedule for each traffic flow according to the different quality requirement. Therefore, if one provides a number of buffers equal to the number of different types of quality requirements, the buffer area in the relay device increases according to the types of buffers.

In view of this, the present inventors has conceived a scheme in which a relay device includes a buffer for each of classes into which quality requirements are classified, and in which the class of the storing buffer is changed (mapped) on the transmission path.

First, consider a situation where a bus master sends a packet storing information of one of (N+1) types of quality requirements with predetermined priorities. The present inventors provided the relay device with N or less types of buffers, and a buffer allocator. The buffer allocator determines one of the N or less types of buffers included in the destination relay device to which the packet is stored. Then, the traffic flow sending schedule is controlled according to the type of the quality requirement of the (N+1) types of quality requirements.

Figure 1:
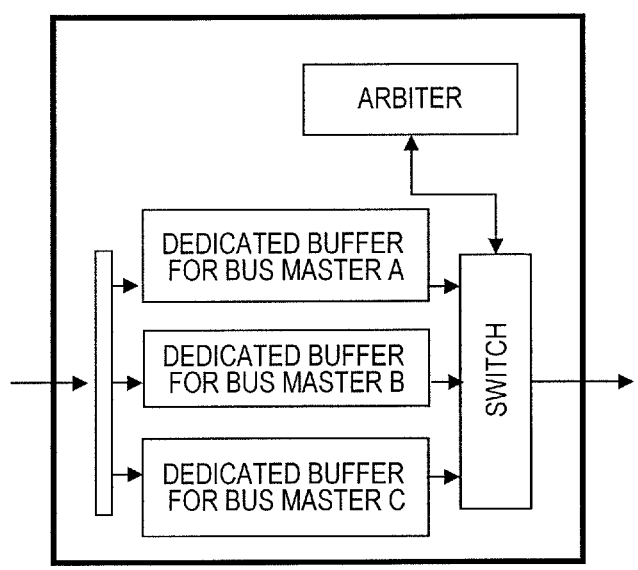
FIG. 1 shows a configuration of a conventional relay device.
Figure 2:
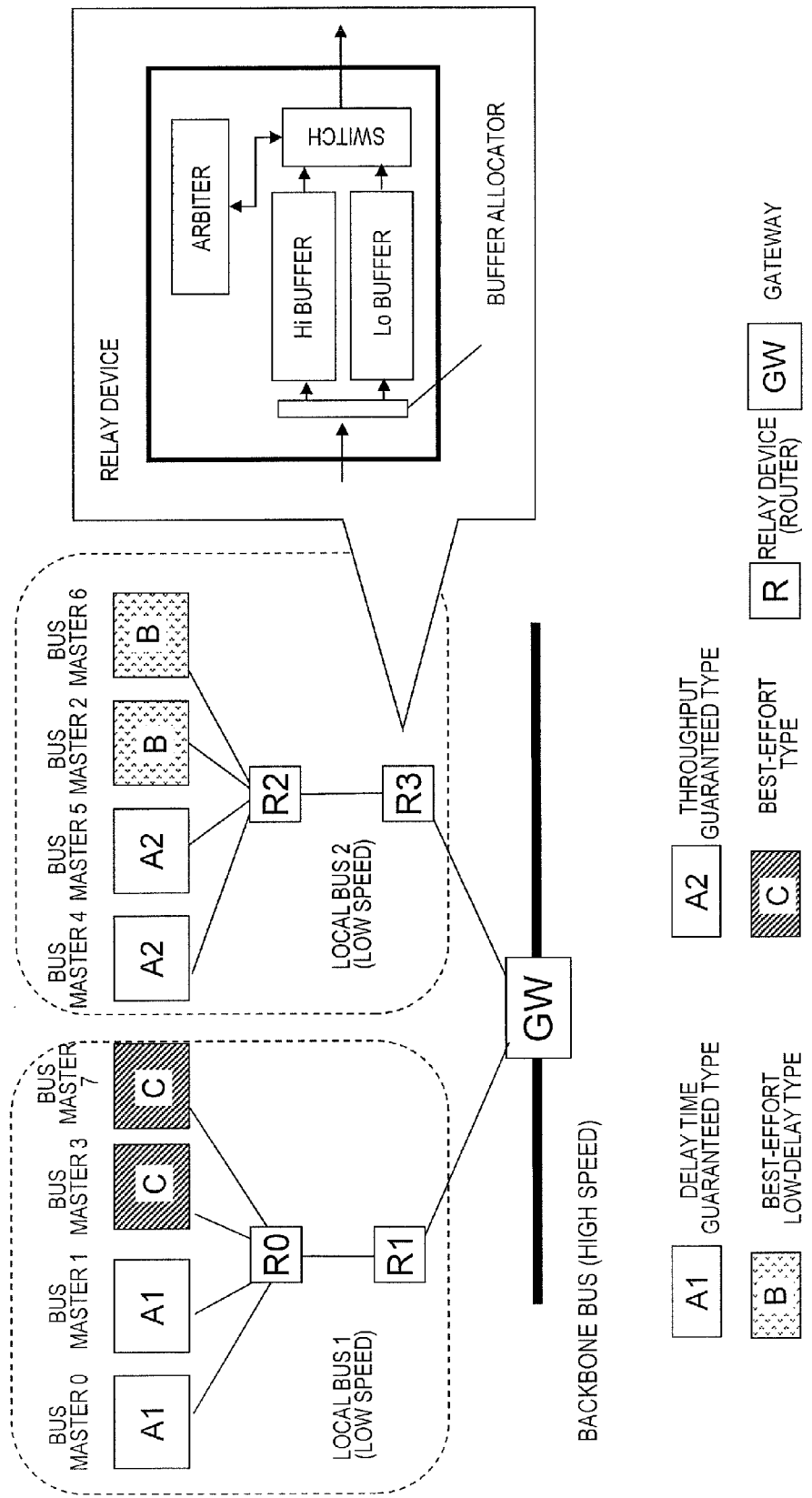
FIG. 2 shows a connection configuration example using a relay device examined by the present inventors.

For example, FIG. 2 shows a connection configuration example using a relay device examined by the present inventors. Local Bus 1 accommodates a traffic flow of the time delay guaranteed type (A1) and a traffic flow of the best-effort type (C), and Local Bus 2 accommodates a traffic flow of the throughput guaranteed type (A2) and a traffic flow of the best-effort low-delay type (B). Where the number of types of quality requirements of traffic flows for each local bus is set to two types, the number of different types of buffers in the relay device can be reduced down to two by varying the priority. Note that buffers store packets of a traffic flow.

The present inventors thought that using such a relay device, the priorities of the quality requirements would be reassigned when allocating buffers to store packets, but the effect of the reassignment of the priorities for the sending scheduling might not be sufficiently reflected on the transmission performance in some cases.

Specifically, although a traffic flow of the best-effort low-delay type (B) is stored in the Lo-class buffer on Local Bus 2 but in the Hi-class buffer on the backbone bus, the priority order of sending schedule may not be reflected in some cases. That is, even if they are stored in Lo and Hi buffers on different busses, with respect to the order of sending, they may not always be transmitted in the priority order of Lo and Hi.

The present disclosure proposes a technique for mitigating the lowering of the transmission performance which occurs when transmitting traffic flows via a plurality of buses and nodes of various levels of transmission performance. The "transmission performance" as used herein refers to an evaluation value regarding transmission that is determined based on the degree of delay or throughput. Now, a bus system will be described below that suppresses the lowering of the performance and maintains a high level of transmission performance by transmitting traffic flows while reassigning the priority.

Figure 3A:
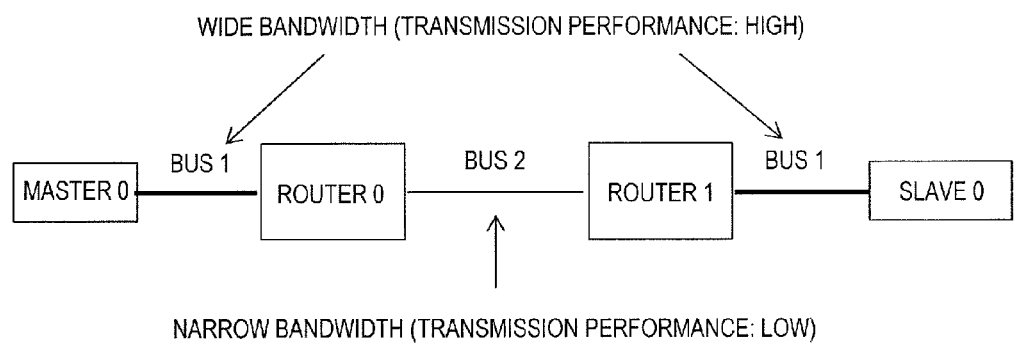
FIGS. 3A and 3B show two cases each of which can be thought to be a cause of variations in transmission performance.
Figure 3B:
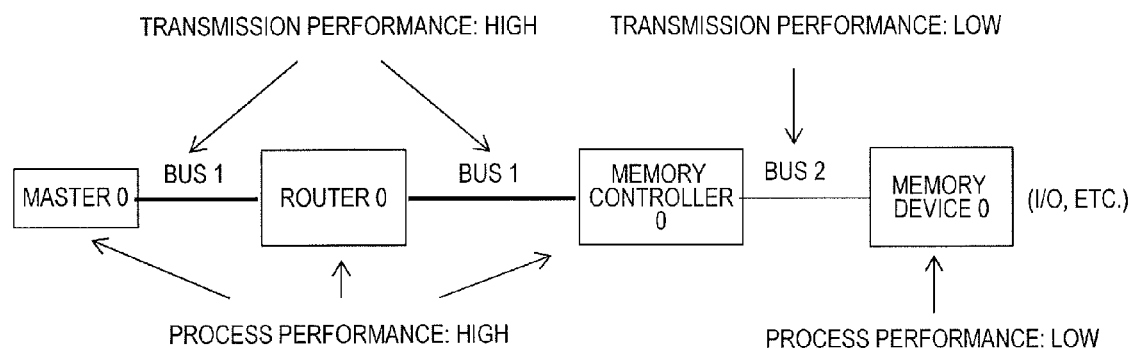

FIGS. 3A and 3B show two cases each of which can be thought to be a cause of variations in transmission performance.

FIG. 3A shows an example where variations in transmission performance occur due to bandwidth variations between buses. Where a bus system is configured by combining together Bus 1 of "wide bandwidth" or "low delay" and Bus 2 of "narrow bandwidth" or "high delay", traffic flows transmitted on Bus 1 are transmitted with a relatively low delay while traffic flows transmitted on Bus 2 are transmitted with a high delay. Particularly, if Bus 2 is a bus of "narrow bandwidth" (specifically, a bus with a relatively small bus width and a low bus frequency), the transmission performance cannot be ensured for transmission from Bus 1 to Bus 2, resulting in a small amount of traffic flow transmission per unit time. This increases the influence due to interference between traffic flows, and increases the delay time required for the transmission including the router. According to the present disclosure, it is possible to reduce the transmission delay in such cases as will be described later.

FIG. 3B shows an example where variations in transmission performance occur due to variations in process performance between nodes. Where a bus system is configured by combining together a node of a high level of process performance and a node of a low level of process performance, traffic flows can be transmitted, while maintaining a high level of transmission performance, between nodes of a high level of process performance. Nodes of high levels of process performance are assumed herein to be routers, masters and memory controllers, for example. Nodes of low levels of process performance are assumed to be memory devices and I/Os, for example.

Note that the "process performance" of a node means the speed at which the node processes data. In other words, it means the amount of data that the node can process per unit time. The particulars of the process differ depending upon whether the node is a router, a memory element, or a master. Below are specific examples.

First, the process performance of a router means the amount of data that can be processed by the router per unit time for a process that is required to send a received packet (e.g., a routing process, a buffer allocation process, and a sending process). Next, the process performance of a memory element means the amount of data that can be written on the memory element per unit time in a case where the memory element actually writes data in a storage area using access data regarding a received data write request. Alternatively, it means the amount of data that can be read out from the memory element per unit time in a case where the memory element reads out data from a storage area by using access data regarding a received data read request. Finally, the process performance of a master means the amount of data calculated, by which the master is capable of processing received data per unit time when receiving the data.

The level of transmission performance of Bus 1 connecting together Master 0, Router 0 and Memory Controller 0 as shown in FIG. 3B is high. On the other hand, the level of transmission performance of Bus 2 connecting together Memory Controller 0 and Memory Device 0 is low. Now, consider an example where a traffic flow is transmitted from a node of a high level of process performance to a node of a low level of process performance, as in communication from Bus 1 to Bus 2 of FIG. 3B. In the case of this example, the process performance of the node of a low level of process performance becomes a bottle neck, and accordingly, a node of a high level of process performance can no longer transmit traffic flows while maintaining a high level of transmission performance. That is, it can be regarded that the transmission performance of the bus between those nodes is lowered.

In the present disclosure, first, a technique relating to the configuration of FIG. 3A will be described. Then, the configuration of FIG. 3B will be described. The present disclosure is also directed to a case where FIG. 3A and FIG. 3B are combined together, and a bus system where the outward path and the return path are separated from each other.

If a local bus and a backbone bus are connected together with a low-speed off-chip bus, the traffic flow transmission performance generally lowers while passing through the low-speed off-chip bus. An "off-chip bus" as used herein refers to an external bus between chips. For example, a bus connecting between a chip corresponding to a master and a chip forming a memory controller corresponds to the "off-chip bus". For off-chip traffic flows passing through the low-speed link, a significant delay is more likely to occur while passing through the off-chip bus as compared with other on-chip traffic flows not passing through the off-chip bus. This increases the delay time until the traffic flow reaches the destination node. Therefore, if one designs the priority in the same manner as with on-chip cases, the off-chip traffic flow transmission performance may lower significantly. The delay time varies depending also on the length of line of the off-chip bus. The delay time further increases if the delay on the off-chip bus is not taken into consideration.

Therefore, there is a need to prevent the lowering of the transmission performance by appropriately changing the "priority", expressed in terms of the class and the transmission deadline time, which represent the priority order of transmission, while taking into consideration the transmission delay on the off-chip bus.

Note that in the present specification, "a higher priority" refers to the order of transmission process for a packet at a router and means that it is processed earlier in a preferential manner, and it is not dependent on the figure expressing the priority being larger or smaller. For example, for the priority, classes may be expressed by figures, e.g., 0 for Class A, 1 for Class B, and 2 for Class C, whereby higher priorities may be given to those of smaller numbers, e.g., in the order of 0, 1 and 2.

Note that for an off-chip bus, e.g., where semiconductor chips are connected together via a line on a printed circuit board or a flexible external cable, the transmission characteristic is different, with a more significant transmission delay, as opposed to that with an on-chip line. A similar transmission delay may occur even with a bus system, which is not an off-chip but which includes a bus of slow transmission within the same chip. That is, within the same chip, a plurality of modules having a networked bus can be connected together via a long line having a multi-stage repeater buffer, for example. Note however that where a significant delay occurs due to the line, that line can be regarded as a low-speed link. Then, the occurrence of the delay described above can be explained.

Now, for example, consider a case where Relay Device R1 and Gateway GW in FIG. 2 are connected together via a low-speed link and Relay Device R3 and Gateway GW are connected together via a high-speed link. Where two packets of the same priority are sent from GW to R1 and from GW to R3, the packet traveling passing through R1 from GW will have a later packet arrival time by the amount of delay time of the low-speed link, even through they have the same priority. In such a case, the transmission performance of the traffic flow passing through the low-speed link may lower.

Therefore, there is a need for developping a bus system which has a high level of transmission performance and which allows for flexible settings, without lowering the transmission performance.

The present disclosure provides a bus system capable of maintaining the transmission performance at a higher level and allowing for flexible settings.

An outline of one embodiment of the present invention is as follows.

A bus system of an embodiment of the present invention is a bus system for a semiconductor circuit, in which data is transmitted on a networked bus between a first node and at least one second node via a relay device arranged on the bus, wherein: the bus system includes a first bus of a relatively low delay and a second bus of a relatively high delay; the first node includes: a buffer (a first buffer) for storing data; and a packet generator for generating a plurality of packets by attaching, to the data stored in the buffer, information specifying a priority of transmission at the relay device; and the relay device includes: a priority converter for converting a priority of each of the plurality of packets based on a priority conversion rule for converting the priority, which is determined based on a transmission delay of the high-delay bus; a buffer allocator for allocating a buffer of a destination relay device to which the packet is to be sent, based on the converted priority; a sending controller for sending packets in a descending order of the priority; and a buffer (a second buffer) for storing packets based on the priority.

For example, the relay device further includes a storage for storing the priority conversion rule.

A bus system of an embodiment of the present invention is a bus system for a semiconductor circuit, in which data is transmitted on a networked bus between a first node and at least one second node via a relay device arranged on the bus, wherein: the bus system includes a first bus of a relatively low delay and a second bus of a relatively high delay; the first node includes: a buffer (a first buffer) for storing data; and a packet generator for generating a plurality of packets by attaching, to the data stored in the buffer, information specifying a priority of transmission at the relay device, which is determined based on a transmission delay of a high-delay bus of a relatively large transmission delay; and the relay device includes: a buffer allocator for allocating a buffer of a destination relay device to which the packet is to be sent, based on the priority; a sending controller for sending packets in a descending order of the priority; and a buffer (a second buffer) for storing packets based on the priority.

For example, the relay device further includes a priority converter for converting a priority of each of the plurality of packets based on a predetermined priority conversion rule; and the buffer allocator allocates a buffer of a destination relay device to which the packet is to be sent, based on the converted priority.

For example, for a packet to be transmitted via the bus of a relatively high delay, the priority converter converts the priority so that the priority becomes higher.

For example, for a packet not to be transmitted via the bus of a relatively high delay, the priority converter converts the priority so that the priority becomes lower.

For example, the priority is determined by at least one of a class representing a rigidness of a quality requirement and a deadline time representing an acceptable delay of the quality requirement.

For example, where the priority is determined by the deadline time representing the acceptable delay of the quality requirement, the priority converter converts the priority so that the deadline time becomes shorter for a certain period of time for each second bus of a relatively high delay through which a packet passes.

For example, the buffer separately stores a packet to be transmitted via the bus of a relatively high delay and a packet to be transmitted via the bus of a relatively low delay.

For example, where the priority is determined by the deadline time representing the acceptable delay of the quality requirement, the sending controller sends packets in an ascending order of the deadline time.

For example, the class representing the rigidness of the quality requirement is defined by at least one of a throughput and an acceptable delay time required by a predetermined node on the bus.

For example, where the priority is determined by the class representing the rigidness of the quality requirement, the buffer allocator and the sending controller of the relay device perform a deadline time comparison process, for a class of a low priority, with a lower granularity than a class of a high priority.

For example, where the priority is determined by the class representing the rigidness of the quality requirement, the buffer of the relay device sets the number of buffers for a class of a low priority to be smaller than the number of buffers for a class of a high priority.

For example, the bus includes a high-delay bus of a relatively large transmission delay; and the transmission delay is determined based on at least one of a wiring length, the number of repeaters, a transmission material, a transmission error rate on a transmission path, and the number of resends on the transmission path.

For example, at least two bus systems are connected to each other by two different transmission paths; the first node and the at least one second node are present on each of the different bus systems; the two transmission paths are used as an outward path and a return path for packets; the outward path is provided with an outward-path relay device for relaying packets; the return path is provided with a return-path relay device for relaying packets; the outward-path relay device at least relays packets transmitted from the first node to the at least one second node, and the return-path relay device at least relays packets transmitted from the at least one second node to the first node; and the outward-path relay device and the return-path relay device are connected to each other.

A computer program of another embodiment of the present invention is a computer program executed by a computer for calculating a priority of transmission to be set in a bus system for a semiconductor circuit, in which a plurality of data are transmitted on a networked bus between a first node and at least one second node via a relay device arranged on the bus, wherein: the bus system includes a first bus of a relatively low delay and a second bus of a relatively high delay; the computer program causes the computer to execute: a step of receiving a priority conversion rule for converting a priority to a priority determined based on a transmission delay of the second bus, and an input of information of a predetermined priority; and a step of calculating a priority of transmission at the relay device based on the predetermined priority and the priority conversion rule.

A bus system of still another embodiment of the present invention is a bus system for a semiconductor circuit, in which data is transmitted on a networked bus between a first node and a second node via at least one relay device arranged on the bus, wherein: the second node has a processing capacity relatively lower than the relay device; the first node and the relay device are connected together via a first bus; the relay device and the second node are connected together via a second bus; a first classification is defined on the first bus whereby packets are processed by the unit of classes each representing a rigidness of a quality requirement, whereas a second classification is defined on the second bus whereby packets are processed by the unit of the first node; the first node includes: a buffer for storing the data; and a packet generator for generating a plurality of packets by attaching, to the data stored in the buffer, a class specifying a priority of transmission at the relay device; and the relay device includes: a buffer manager for receiving the plurality of packets via the first bus; a buffer for storing the received packets, a priority converter for performing a priority process of identifying a first node of a sender of the plurality of packets and converting from the packet process by the unit of classes to the packet process by the unit of the first node; and a sending controller for sending the data via the second bus in a descending order of the converted priority, which indicates the order in which packets are sent.

A bus system of still another embodiment of the present invention is a bus system for a semiconductor circuit, in which data is transmitted on a networked bus between a first node and a second node via a plurality of relay devices arranged on the bus, wherein: the second node has a processing capacity relatively lower than the relay device; the bus system includes an outward path and a return path, independent of each other, as paths along which packets are transmitted; the first node and the relay device are connected together via a first bus of the outward path; the relay device and the second node are connected together via a second bus of the outward path; a first classification is defined on the first bus whereby packets are processed by the unit of classes each representing a rigidness of a quality requirement, whereas a second classification is defined on the second bus whereby packets are processed by the unit of the first node; a first relay device is arranged between the first bus and the second bus; the first relay device includes: a buffer manager for receiving the plurality of packets via the first bus; a buffer for storing the received packets; a priority converter for performing a priority process of identifying a first node of a sender of the plurality of packets and converting from the packet process by the unit of classes to the packet process by the unit of the first node; and a sending controller for sending the data via the second bus in a descending order of the converted priority, which indicates the order in which packets are sent; a second relay device is arranged on the return path; and the second relay device transmits a plurality of packets from the second node to the first node without distinguishing between priorities of transmission of the plurality of packets.

For example, the first relay device further includes: a rate manager for storing a sending rate for each first node; and a sending controller for assigning, to a plurality of packets stored in the buffer, a first priority order based on a sending rate set in the rate manager and a second priority order based on the priority of class which has been converted to the unit of the first node, wherein the data is sent by preferentially using the first priority order.

For example, the first relay device further includes a flow controller for obtaining a status indicating whether the data can be received from the second node of a destination.

For example, the first relay device further includes a sending controller for performing a sending process so that a sending rate is even between a plurality of first nodes of the same priority, in a case where priorities of converted classes are equal to one another.

A relay device, which is an embodiment of the present invention, will now be described with reference to the accompanying drawings.

The present specification will explain a technique for distributed buses (NoC) in a semiconductor integrated circuit, where different semiconductor modules are used in combination, the technique allowing for flexible settings of the priority required for transmitting traffic flows while maintaining a high level of transmission performance.

The present inventors converted the priority of a traffic flow in a relay device. That is, for a traffic flow being transmitted form a local bus to a system bus via a low-speed link therebetween, the priority of the quality requirement defined on the system bus was construed to be a priority that is higher than the quality requirement defined on the local bus. In other words, the priority of the originally-defined quality requirement was converted to a higher priority.

In a relay device, which is an embodiment of the present invention, the class, which represents the rigidness of the quality requirement, and the deadline time are used as the priority, and the buffer allocation for packets and the order of sending packets are controlled according to the priority, i.e., in a descending order of the priority. Priorities are relatively defined in advance by the designer based on different quality requirements of traffic flows sent from different masters, and the transmission bands of the buses. The "conversion of the priority" refers to switching from one priority to another so that the same packet can be transmitted with different priorities (classes and deadline times). The conversion of the priority also includes switching the priority for use in transmission to another without overwriting the priority (re-writing the converted priority in the area where the packet's priority is stored). Where a plurality of semiconductor devices implementing masters and routers on silicon devices are used in combination, the priority is converted to a higher priority because the local bus and the system bus are connected together via a low-speed off-chip bus, and a significant delay time is produced by the low-speed bus. This has made it possible to realize a shorter delay. For a traffic flow passing through an off-chip bus, as compared with another traffic flow not passing through an off-chip bus, the delay time until it reaches the destination node is likely to be more significant due to the significant delay occurring while passing through the off-chip bus. The delay time may also vary depending on the length of the line of the off-chip bus. Also in order to accommodate an increase in the delay time from such transmissions, the priority is converted to a higher priority, thereby allowing for a transmission process with a shorter delay. The details will be described in conjunction with example embodiments below.

FIG. 4 shows a process policy according to the present embodiment.

A plurality of local buses 0-N are connected to a system bus via low-speed links. Traffic flows of a plurality of masters arranged on local buses merge onto the system bus. For the local buses, the amount of changes to the settings is kept small so that it is possible to efficiently utilize legacy resources developed in the past. Therefore, on the system bus, the priority is converted so that transmission can be done with a priority different from those defined on the local buses. Taking the transmission delay along a low-speed link into account, a traffic flow passing through a low-speed link is transmitted with a higher priority. Moreover, in a relay device on the system bus, in order to suppress interference occurring while allocating a storing buffer, traffic flows passing through low-speed links and other traffic flows are stored in buffers while being separated from each other, and traffic flows passing through low-speed links are transmitted with an even shorter delay.

In the example of the present disclosure, a local bus means a bus provided separately from a normal bus for directly connecting particular devices together or otherwise providing a similar connection in order to realize high-speed data exchange between the devices. A system bus means a bus for connecting a plurality of local buses together.

In the present specification, a relay device may be referred to also as a "router".

Figure 5:
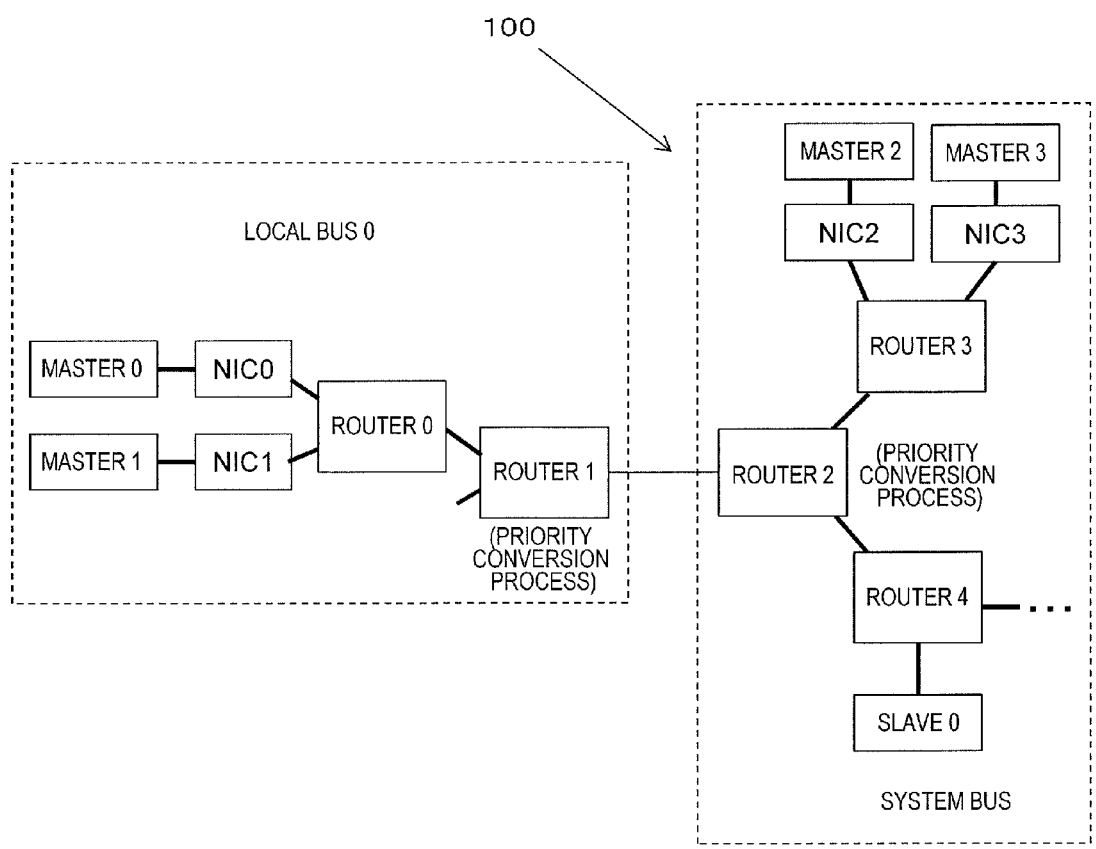
FIG. 5 shows a configuration of a bus system 100 according to an example embodiment.

FIG. 5 shows a configuration of a bus system 100 of the present embodiment. FIG. 5 also shows the arrangement of routers for performing a priority conversion process in the bus system 100.

In the bus system 100 of the present embodiment, a plurality of masters (first nodes) arranged on a bus are connected to a router via network interface controllers (NICs). An NIC converts access data bound for a slave sent from a master into a packet. A packet passes through at least one router to arrive at the destination slave (second node).

The slave extracts access data from the packet to access a memory device (not shown) such as a DRAM, for example. The slave again converts response data, obtained by accessing the device, into a packet, and sends the packet to a master as a response packet.

In order to minimize the amount of changes to the settings of the local bus as a whole, it is efficient that the priority conversion process is performed by a relay device, which is directly connected to an off-chip bus connecting together the local bus and the system bus. For example, where Router 1 and Router 2 are connected together via a low-speed off-chip bus, at least one of Router 1 and Router 2 may perform the priority conversion process. For example, where Router 1 performs the conversion process, there is no need to change the settings of the bus on the Router 2 side. On the other hand, where Router 2 performs the conversion process, there is no need to change the settings of the bus on the Router 1 side. An example of the latter is a case where the bus on the Router 1 side is configured within a modular external chip, and the settings of the external chip cannot be changed. The present embodiment will describe an example where Router 2 performs the conversion process.

The priority conversion process may be performed by Router 0 or Router 4, rather than a relay device directly connected to the off-chip bus. As a router other than Router 1 or Router 2 performs the priority conversion process, it is possible to improve the local transmission performance.

In such a case, however, it should be noted that the efficiency of setting or the transmission efficiency may possibly lower. This is because traffic flows of all the masters arranged on Local Bus 0 are subjected to conversion if Router 1 is responsible for the process, whereas only the masters passing through Router 0 are subjected to conversion if Router 0 is responsible for the process. Therefore, in order to perform the conversion on traffic flows of all the masters on Local Bus 0, it may become necessary that other routers also perform the conversion process. Therefore, there is a possibility that the number of relay devices that are set for conversion may increase. In Router 0, there is a possibility that the quality requirement of the traffic flow may slightly lower, or the bandwidth of the transmission path of the bus may not always be used with optimal sending scheduling. This is because a traffic flow is sent based on the definition of priority after conversion, rather than the original definition of priority for the local bus. Similarly, also where Router 4 is responsible for the conversion process, the sending scheduling is performed based on the definition of priority for the local bus before conversion in Router 2, which may thereby lower the efficiency similarly.

Figure 6:
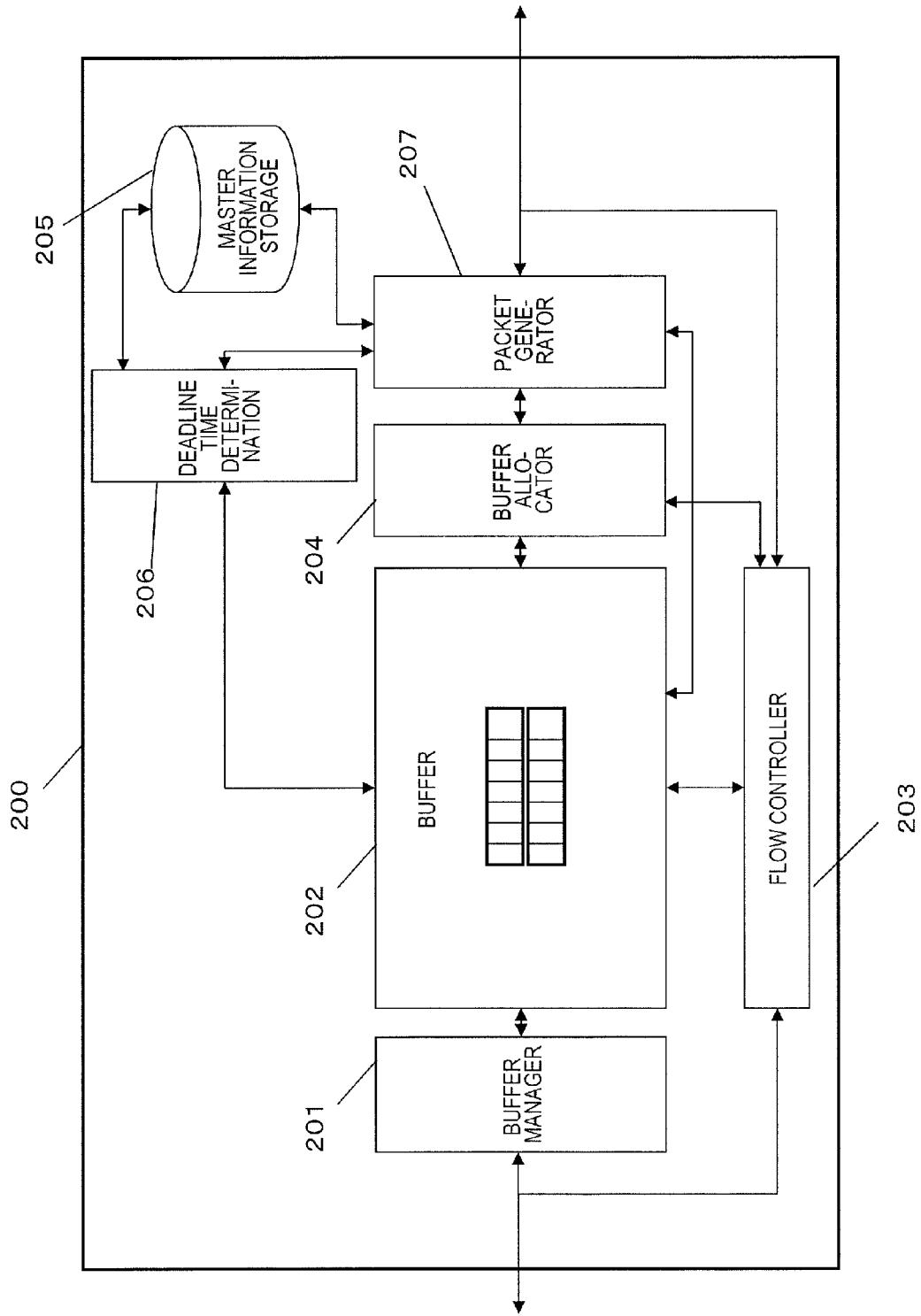
FIG. 6 shows a configuration of a network interface controller (NIC) 200.

FIG. 6 shows a configuration of an NIC 200.

The NIC 200 receives access data from a master to a slave, converts it to a packet by attaching information of the priority, and sends it to a router. The NIC 200 is implemented as a circuit, for example. Components of the NIC 200 to be described next can be implemented as circuit elements for performing pre-programmed operations in order to perform such functions/operations.

The NIC 200 includes a buffer manager 201, a buffer 202, a flow controller 203, a buffer allocator 204, a master information storage 205, a deadline time determination circuit 206, and a packet generator 207.

The buffer manager 201 receives access data from a master to a slave, and stores the access data in a vacant buffer of the buffer 202. The buffer manager 201 may have a receiving terminal (not shown).

The buffer 202 is a so-called buffer. The buffer 202 stores the received access data.

The flow controller 203 obtains a vacant buffer ID of the destination router.

The buffer allocator 204 allocates a storing buffer ID at the destination router based on the obtained vacant buffer ID.

The master information storage 205 is implemented by a storage element such as a flip flop, for example, and stores information of the master ID, the class and the acceptable delay time.

The deadline time determination circuit 206 determines the deadline time for the transmission of a traffic flow. The deadline time can be implemented by the value of a counter driven by the bus clock supplied to the semiconductor bus system, for example. While the present embodiment is directed to a method of determining the order of transmission based on a comparison of deadline time within the same class, the deadline time may be any information representing the degree of emergency in time for the transmission of a packet within the same class. For example, the degree of emergency in time for the transmission may be represented by the request generation time of the packet, instead of the deadline time.

The packet generator 207 converts the access data stored in the buffer into a packet by attaching the master ID, the class, the deadline time, the storage buffer ID, the start code and the end code, and sends it to the router.

The flow controller 203, the buffer allocator 204, the deadline time determination circuit 206 and the packet generator 207 described above are formed by semiconductor circuits.

Figure 7:
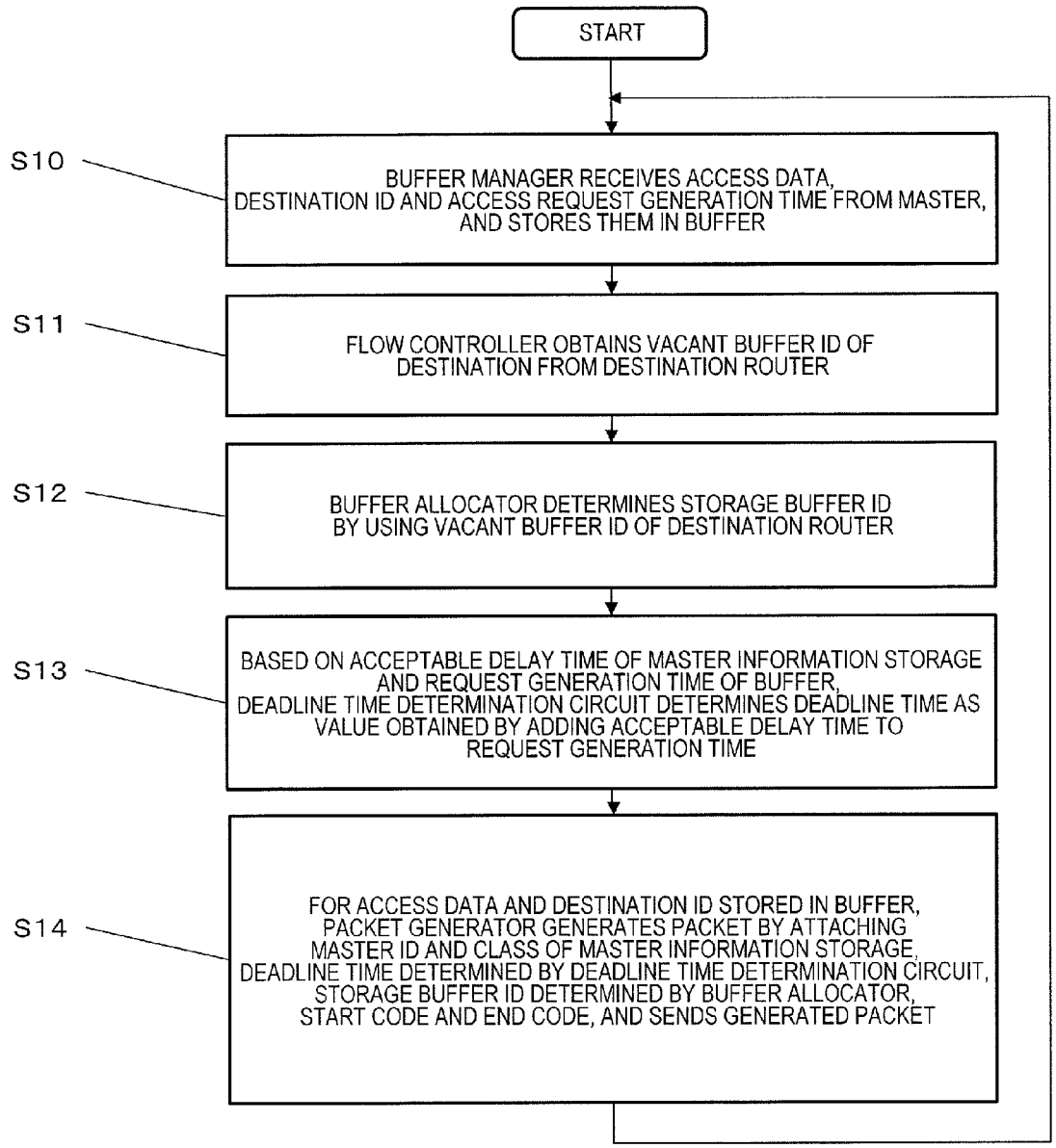
FIG. 7 is a flow chart showing an operation procedure of an NIC.

FIG. 7 shows an operation flow of the NIC 200.

In step S10, the buffer manager 201 receives access data, destination ID and access request generation time from the master, and stores them in the buffer 202.

In step S11, the flow controller 203 obtains a vacant buffer ID of the destination from the destination router.

In step S12, the buffer allocator 204 determines the storage buffer ID by using the vacant buffer ID of the destination router.

In step S13, based on the acceptable delay time stored in the master information storage 205 and the request generation time of the buffer 202, the deadline time determination circuit 206 determines the deadline time as a value obtained by adding the acceptable delay time to the request generation time.

In step S14, for the access data and the destination ID stored in the buffer 202, the packet generator 207 generates a packet by attaching the master ID and the class of the master information storage 205, the deadline time determined by the deadline time determination circuit, the storage buffer ID determined by the buffer allocator 204, the start code and the end code, and sends the generated packet. Note that the request generation time may be the time at which the access data was received from the master.

FIG. 8 shows a configuration example of information stored in the master information storage 205.

The master information storage 205 has the master ID representing the sender of the packet, the class and the acceptable delay time for determining the priority of the transmission of the packet. Note that the acceptable delay time represents the maximum transmission delay time that can be consumed before the packet arrives at the node to be the transmission destination, based on the quality requirement of the master, and is used when calculating the arrival deadline time. For example, the node to be the transmission destination may be a slave, which is the access destination, or a master, which is the sender to receive the response packet from the slave.

Figure 9:
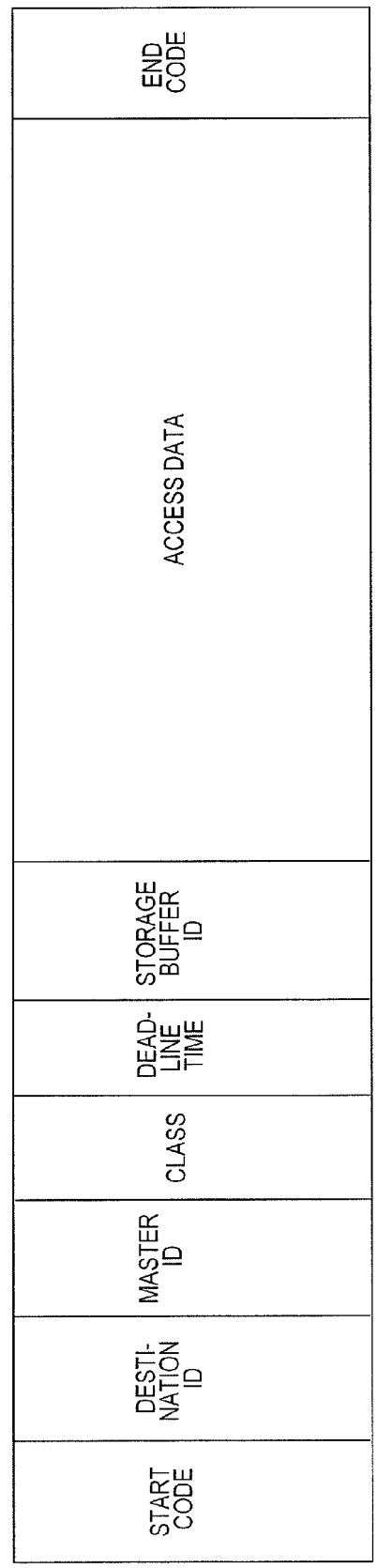
FIG. 9 shows a configuration of a packet.

FIG. 9 shows a configuration of a packet.

A packet includes a start code, a destination ID, a master ID, a class, a deadline time, a storage buffer ID, access data, and an end code.

Figure 10:
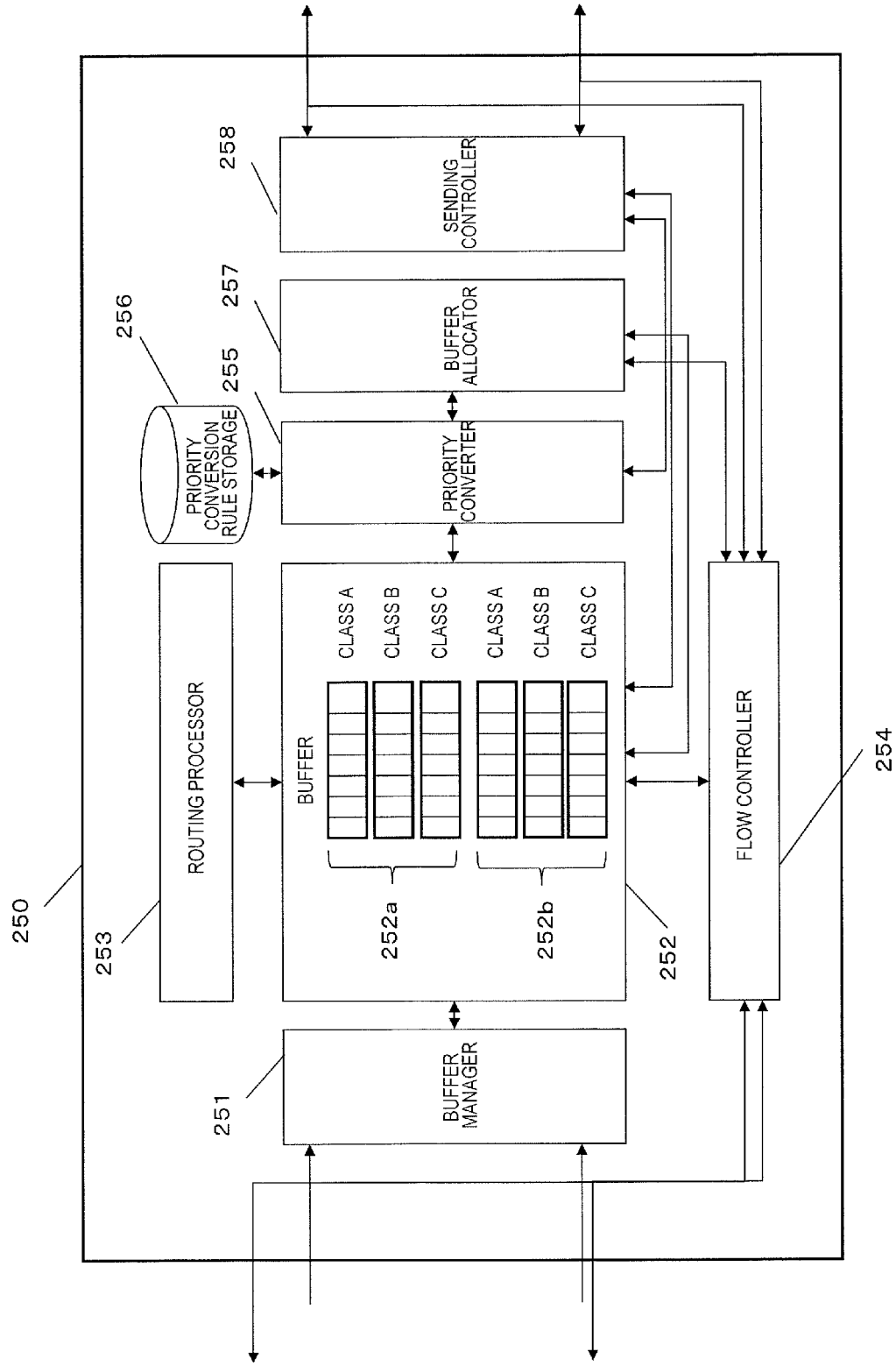
FIG. 10 shows a configuration of a router 250 for converting the priority.

FIG. 10 shows a configuration of a router 250 for converting the priority.

The router 250, which converts the priority, performs the packet priority conversion with a definition of priority different from that of the bus side of the sender, so as to allocate the buffer and determine the order of sending based on the converted priority. It is ensured that the priority conversion performed here is reflected in normal routers at the destination.

The router 250 responsible for the priority conversion includes a buffer manager 251, a buffer 252, a routing processor 253, a flow controller 254, a priority converter 255, a priority conversion rule storage 256, a buffer allocator 257, and a sending controller 258.

The buffer manager 251 receives a packet, and stores the packet in the buffer 252. When storing the packet, the packet is stored in a buffer corresponding to the storage buffer ID of the packet. Note that the buffer manager 251 may includes a receiving terminal (not shown).

The buffer 252 includes a first buffer 252a and a second buffer 252b. The first buffer 252a is a buffer for storing packets passing through low-speed links, and the second buffer 252b is a buffer for storing packets not stored in the first buffer 252a. Packets to be stored in the first buffer 252a and the second buffer 252b may be stored separately based on the classes.

The term "separately storing" packets means that buffers capable of storage are physically separated from one another, and sending can be switched for each buffer. Thus, it is possible to suppress interference between separate traffic flows. They do not need to be physically separated from one another as long as they are logically separated from one another by using a memory element that can be accessed randomly. Specifically, it is only required that sending can be switched, and buffer areas to be used are managed while being logically separated from one another.

The routing processor 253 determines the output port for sending the packet based on the destination ID.

The flow controller 254 obtains a vacant buffer ID of the destination router.

The priority converter 255 converts the priority of the packet by referring to the rule stored in the priority conversion rule storage 256 to be described later.

The priority conversion rule storage 256 (hereinafter referred to as "the storage 256") is implemented by a storage element such as a flip flop, and store the rule for the priority conversion.

The buffer allocator 257 determines the storage buffer ID at the destination router based on the converted priority.

The sending controller 258 controls the sending of packets in a descending order of the converted priority.

The routing processor 253, the flow controller 254, the priority converter 255, the buffer allocator 257 and the sending controller 258 described above are formed by semiconductor circuits.

Note that the result of the priority conversion performed by the router 250 is handed over to the destination router. Specifically, regarding the class, packets received by the destination router are stored in buffers separately for different classes so that the class of a packet can be determined based on the stored buffer ID. For example, where Class A, Class B and Class C are assigned to Buffer 0, Buffer 1 and Buffer 2, respectively, in each router, and a Class B packet is to be converted to Class A, the class of a packet can be switched to another by assigning a packet stored in Buffer 1 so that it is stored in Buffer 0 of the destination router, and it is possible at the destination router to determine that it is Class A based on the buffer ID, irrespective of the class attached to the packet.

Note that as another method, the converted class may be recorded in the packet by overwriting the class of the packet, so that the buffer allocation and the sending control are performed in the destination router based on the priority of the class of the packet. Regarding the deadline time, the converted deadline time is recorded so as to overwrite the deadline time attached to the packet so that the buffer allocation and the sending control are performed in the destination router based on the deadline time overwritten in the packet. Thus, the converted priority (the class and the deadline time) can be handed over to the destination router.

Figure 11:
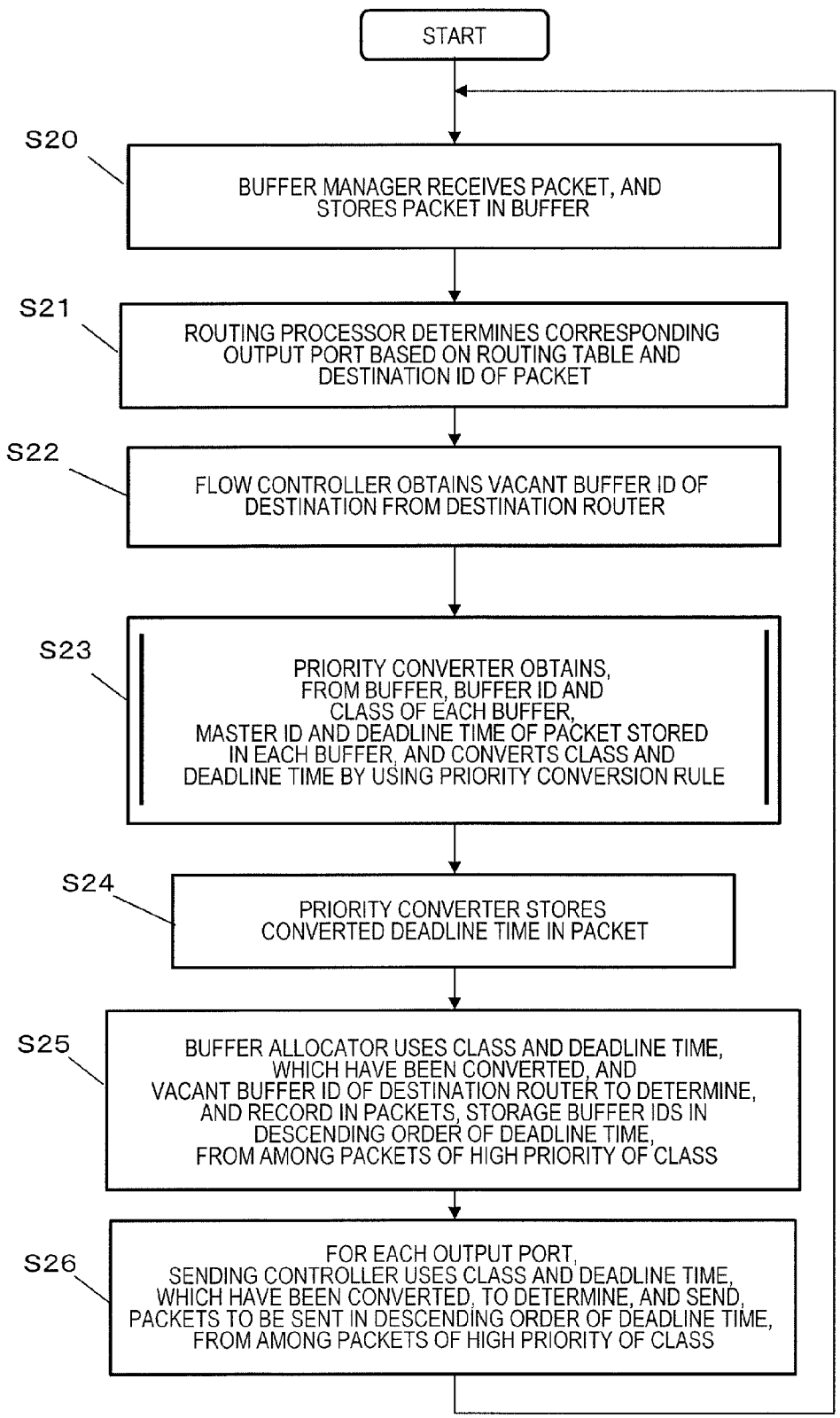
FIG. 11 is a flow chart showing an operation procedure of the router 250 for converting the priority.

FIG. 11 shows an operation flow of the router 250 performing the priority conversion.

In step S20, the buffer manager 251 receives a packet, and stores the packet in the first buffer 252a or the second buffer 252b of the buffer 252 based on whether or not the packet passes through a low-speed link. In this process, inside the first buffer 252a or the second buffer 252b, the storage is done according to the class of the packet.

In step S21, the routing processor 253 determines the corresponding output port based on the routing table and the destination ID of the packet.

In step S22, the flow controller 254 obtains a vacant buffer ID of the destination from the destination router.

In step S23, the priority converter 255 obtains, from the buffer 252, the buffer ID and the class of each buffer, the master ID and the deadline time of the packet stored in each buffer, and converts the class and the deadline time by using the priority conversion rule stored in the storage 256.

In step S24, the priority converter 255 stores the converted deadline time in the packet.

In step S25, the buffer allocator 257 uses the class and the deadline time, which have been converted, and the vacant buffer ID of the destination router to determine, and record in packets, storage buffer IDs in a descending order of the deadline time, from among packets of a high priority of the class.

In step S26, for each output port, the sending controller 258 uses the class and the deadline time, which have been converted, to determine, and send, packets to be sent in a descending order of the deadline time, from among packets of a high priority of the class.

Note that for the process of selecting packets in a descending order of the deadline time, the process time required for time comparison is likely to be long. Therefore, the designer may be allowed to set, in advance, the number of bits for use in the deadline time comparison according to how semiconductor devices are combined together and while taking into consideration the resources and transmission performance required for the process. Then, for a class for which the quality requirement is rigid and whose priority is high, since the acceptable delay time is small and the range of deadline time necessary for comparison is narrow, one may eliminate upper bits of time values that are not necessary for comparison, without changing the granularity of the numerical expression of time.

For a class for which the quality requirement is less rigid and whose priority is low, one may eliminate lower bits of the value in order to reduce the process time while lowering the granularity of the numerical expression of time. Specifically, registers (storage elements) for specifying the bits to be used for time comparison for each class are provided in the buffer allocator 257 and the sending controller 258 of the router 250. As for the method for setting the registers, for example, they may be fixedly set at the startup of the bus system 100, or signal lines for the registers may be routed across the bus system 100 so that the settings are done by a processor writing setting values to the registers via the signal lines. The comparison operation circuit used in deadline time comparison may be provided separately for the buffer allocator 257 and the sending controller 258, or the same circuit may be shared.

Similarly, the designer may be allowed to set, in advance, the number of buffers to be assigned to each class, so as to reduce the process time required for the comparison of the priority, according to how semiconductor devices are combined together and while taking into consideration the resources and transmission performance required for the process. Then, for a class for which the quality requirement is rigid and whose priority is high, a sufficient number of buffers may be provided so that the transmission performance will not be lowered, whereas for a class for which the quality requirement is less rigid, the number of buffers may be small to save the resources. Specifically, registers (storage elements) for specifying the class for each buffer of the destination router are provided in the buffer allocator. As with the registers for specifying the bits of the deadline time, the registers may be fixedly set at the startup, or may be set by a processor writing setting values to the registers via signal lines.

Figure 12:
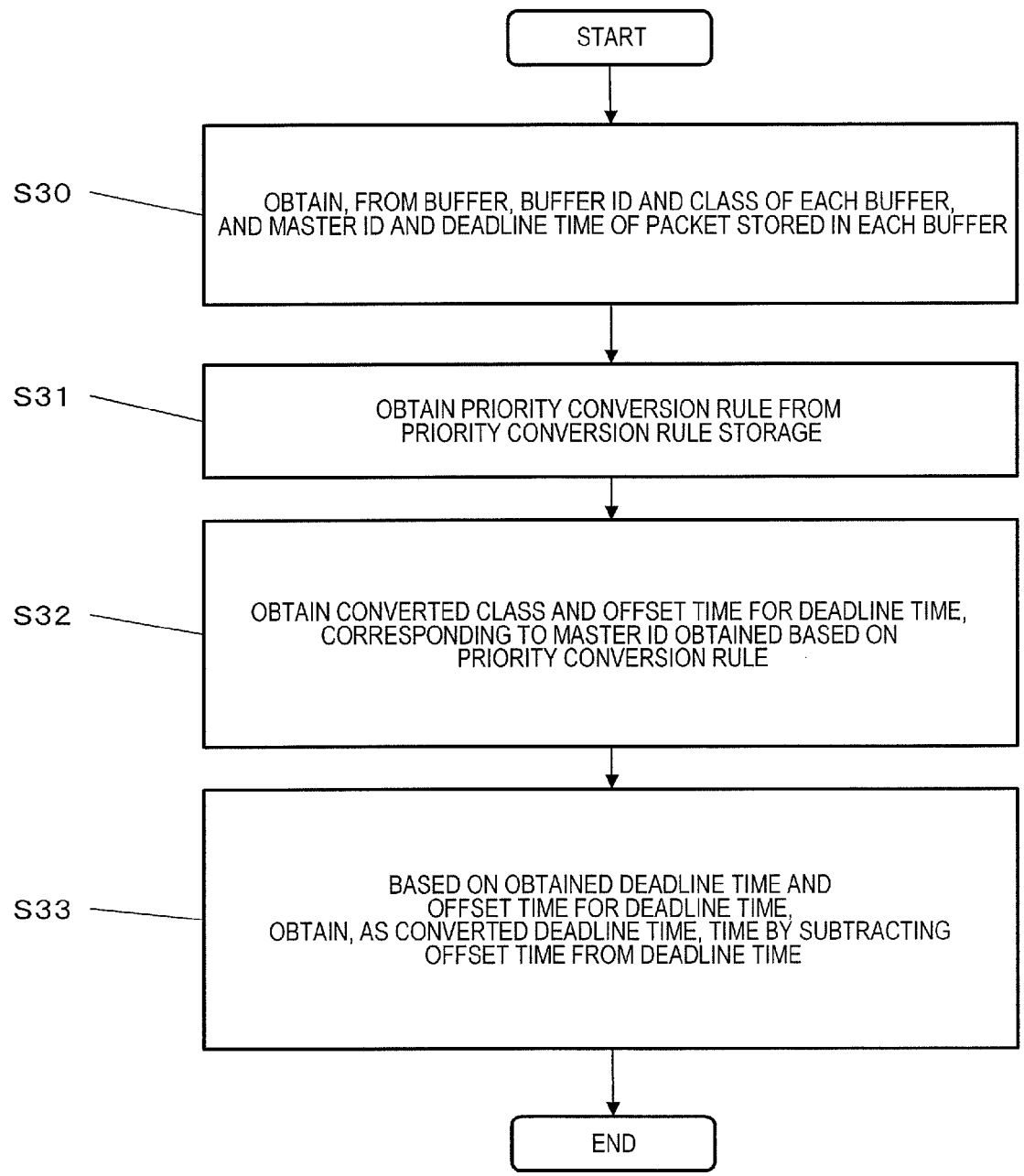
FIG. 12 is a flow chart showing an operation procedure of a priority converter 255.

FIG. 12 shows an operation flow of the priority converter 255.

In step S30, the priority converter 255 obtains, from the buffer 252, the buffer ID and the class of each buffer, and the master ID and the deadline time of the packet stored in each buffer. In step S31, the priority converter 255 obtains the priority conversion rule from the storage 256. In step S32, the priority converter 255 obtains the converted class and offset time for deadline time, corresponding to the master ID obtained based on the priority conversion rule. In step S33, based on the obtained deadline time and the offset time for the deadline time, the priority converter 255 obtains, as the converted deadline time, a time by subtracting the offset time from the deadline time.

FIG. 13 shows the priority conversion rule stored in the storage 256.

The priority conversion rule is configured as a table representing the correspondence between the master ID and at least one of the converted class or the offset time for the deadline time. For example, there are three classes of Class A, Class B and Class C, and the offset time is expressed in an integer value by the unit of bus clock cycles. While the original class of Master 0 passing through a low-speed link is Class B, the class is converted to Class A of a higher priority. Since the offset time for the deadline time is 400, the converted deadline time is obtained by subtracting 400 cycles from the deadline time. The buffer allocation and the sending control are performed based on the class and the deadline time, which have been converted.

Note that the converted class and offset time are analytically determined beforehand by the designer based on, for example, transmission simulation, the wiring length, and the transmission characteristic of the wiring of the printed circuit board, based on the transmission delay of the bus to be determined. Similarly, the original class of Master 1 is Class C, and it is transmitted on a local bus while being distinguished from the class of Master 0. Since it is also converted to Class A as with Master 0, it is transmitted with the priority of the same class. Since it shares the same low-speed link as Master 0 and requires the same transmission delay, the offset time for the deadline time is set to be the same value (400 cycles) as Master 0. For Master 2, which does not pass through a low-speed link, the unconverted class and the converted class are set to be the same, so that the same priority is used before and after conversion, and the offset time for the deadline time is set to be 0 cycle. Although Master 2 is Class B, the same class as the original class of Master 0, the packet of Master 0 is converted to Class A as opposed to Master 2 so that Master 0 can be transmitted to the destination with a higher priority, in view of the delay through the low-speed link of Master 0. For Master 4 and Master 5, since they merge onto the system bus through different off-chip buses from Master 0 and Master 1, the transmission delay on the off-chip bus is different, and the offset time for the deadline time is set to be a different value (e.g., 500 cycles).

The priority conversion rule may be implemented in such a manner that the priority conversion rule can be set by registers (storage elements). As for the method for setting the registers, for example, they may be fixedly set at the startup of the bus system 100, or signal lines for the registers may be routed across the bus system 100 so that the settings are done by a processor writing setting values to the registers via the signal lines.

As another method for specifying the class after conversion, it may be specified as the relative difference between the priority of the class before conversion and that after conversion. For example, where a master of a processor (CPU) and a master of a video decoding process are provided off-chip, these masters are distinguished from each other, and the class is converted with a priority that is "1" step higher for the master of a processor for which the delay is not rigid, whereas the class is converted with a priority that is "2" steps higher for the master of a video decoding process for which the delay is rigid. It may be specified as the relative difference of the priority after conversion with respect to that before conversion.

As an easier implementation method for distinguishing between an off-chip master and an on-chip master when converting the priority, a packet may be given a flag attached thereto representing whether it passes through a low-speed off-chip bus. For example, the flag is set to "1" for a packet sent from an off-chip master, and the flag is set to "0" for a packet sent from an on-chip master. At the router 250 for converting the priority, the priority is converted based on the flag. For example, no priority conversion may be performed for a packet whose flag is "0", whereas for a packet whose flag is "1", the conversion may be done with the same priority, irrespective of the master, so that the converted class is Class A, or the conversion may be done so that the priority of the converted class is 2 steps higher than that of the unconverted class.

Figure 14:
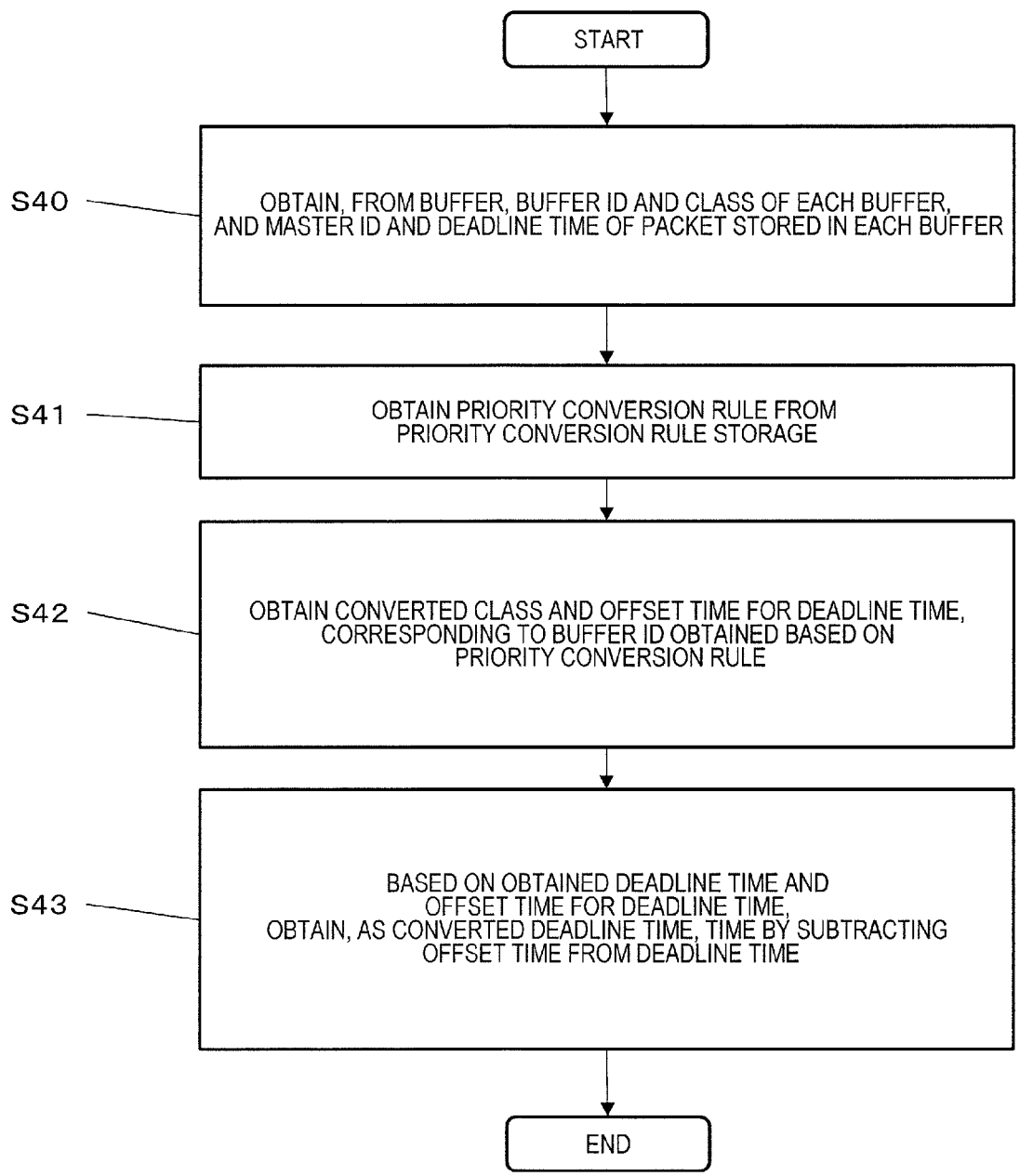
FIG. 14 is a flow chart showing an operation procedure of the priority converter 255 where the priority is converted by using buffer IDs, instead of master IDs.

FIG. 14 shows an operation flow of the priority converter 255 when the priority is converted by using buffer IDs, instead of master IDs.

Where the priority is converted by using buffer IDs rather than master IDs, if the buffer includes a buffer for storing a packet passing through a low-speed link and a buffer for storing a packet not passing through a low-speed link, the priority can be converted while distinguishing between packets passing through a low-speed link and those not passing through a low-speed link. The operation flow of the priority converter 255 of FIG. 14 is the same as FIG. 12, except for step S42. In step S42, the priority converter 255 obtains the converted class and offset time for deadline time, corresponding to the buffer ID obtained based on the priority conversion rule. That is, in step S32 of FIG. 12, when converting the priority by using the priority conversion rule, the priority converter 255 obtains elements corresponding to a master ID (the converted class and offset time for deadline time), whereas in step S42, the process of step S32 has been changed to a process in which elements corresponding to a buffer ID are obtained.

A comparison between the conversion of the priority using a master ID and the conversion of the priority using a buffer ID shows the following difference. That is, with the former, the priority can be set for each master, but when the number of masters becomes large, there are disadvantages that the process time for applying the priority conversion rule increases and the number of setting items increases. With the latter, the priority conversion rule is determined for each buffer storing a packet, and it is not possible to represent different converted priorities between masters. However, with the latter, it is not needed to extract a master ID from a packet, and the priority conversion rule can be applied with the granularity of the number of buffers without distinguishing between masters, making it possible to shorten the process time for conversion when the number of buffers is smaller than the number of masters.

FIG. 15 shows a priority conversion rule stored in the priority conversion rule storage where buffer IDs are used.

For example, for Buffer 0 storing a packet of Class A passing through a low-speed link, the converted class is set to be Class A and the offset time for the deadline time is set to be 450 cycles. Similarly, for Buffer 1 storing a packet of Class B passing through a low-speed link, the converted class is set to be Class A and the offset time for the deadline time is set to be 450 cycles. Similarly, a packet of Class A not passing through a low-speed link is stored in Buffer 3, for which the converted priority remains unchanged, the converted class is Class A, and the offset time for the deadline time is 0 cycle.

While the priority conversion is performed based on either master IDs or buffer IDs in the present embodiment, the priority conversion may be performed similarly by using traffic flow IDs with which it is possible to identify traffic flows sent from the same master. In such a case, the priority conversion rule is configured as a table representing the correspondence between at least traffic flow IDs and converted priorities, the NIC 200 attaches the traffic flow ID obtained from the sender master to the packet, and the router 250 performs the priority conversion based on the attached traffic flow ID and the priority conversion rule. Where traffic flow IDs are used, as compared with a case where master IDs are used, it is possible to determine the priority conversion rule for each type of traffic flows sent from one master. For example, traffic flows issued by an application for which the throughput particularly needs to be guaranteed (e.g., an application using a sound), of all the traffic flows sent from the master of a processor, may be transmitted while switching to a higher priority by the priority conversion rule, while making no change to the priority for other applications for which the throughput does not need to be guaranteed. In such a case, by converting the priority using traffic flow IDs, rather than converting the priority using master IDs, different priority conversion rules can be applied to a plurality of traffic flows sent from one master.

Figure 16:
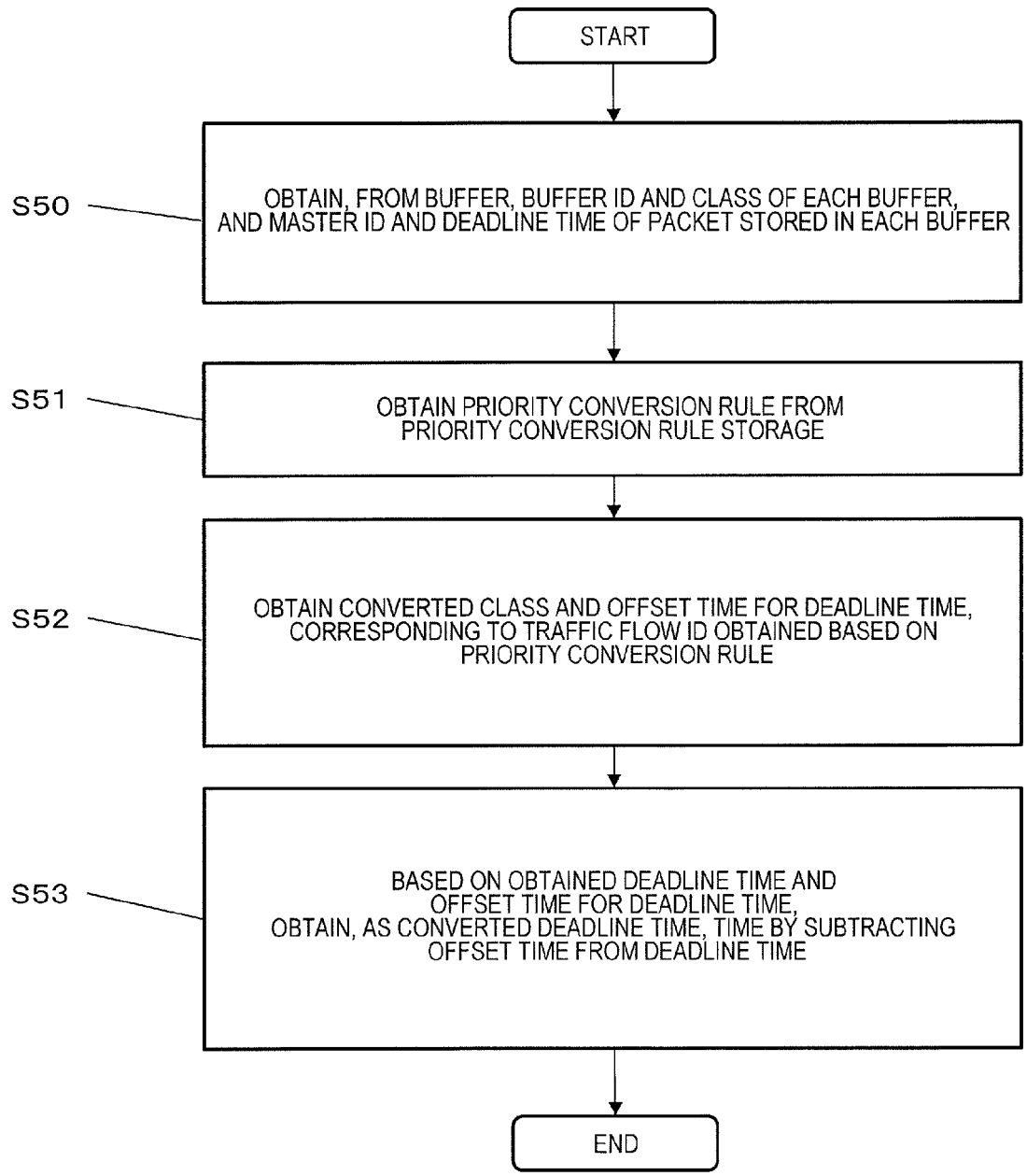
FIG. 16 is a flow chart showing an operation procedure of the priority converter 255 where the priority is converted by using traffic flow IDs, instead of master IDs.

FIG. 16 shows an operation flow of the priority converter 255 when the priority is converted using traffic flow IDs, instead of master IDs. In FIG. 16, in comparison with FIG. 12, steps S30 and S32 are different while steps S31 and S33 remain unchanged.

In step S30, the priority converter 255 obtains, from the buffer, the buffer ID and the class of each buffer, and the traffic flow ID and the deadline time of the packet stored in each buffer. That is, in step S32 of FIG. 12, when the priority is converted by using the priority conversion rule, the priority converter 255 obtains elements corresponding to a master ID (the converted class and offset time for deadline time), whereas the process of step 50 has been changed to a process in which elements corresponding to a traffic flow ID are obtained. Due to this difference, master ID is also changed to traffic flow ID in step S52 of FIG. 16.

Regarding traffic flow IDs attached to packets, as with destination IDs attached to packets, when the master sends access data, the master attaches a traffic flow ID to the access data, and when the NIC 200 sends a packet, the NIC 200 attaches a traffic flow ID to the access data to generate a packet and sends the packet.

FIG. 17 shows a priority conversion rule stored in the priority conversion rule storage where traffic flow IDs are used.

For example, in FIG. 17, for a packet of Traffic Flow 0 passing through a low-speed link, the converted class is set to be Class A and the offset time for the deadline time is set to be 400 cycles. Similarly, for a packet of Traffic Flow 1 passing through a low-speed link, the converted class is set to be Class A and the offset time for the deadline time is set to be 400 cycles. Similarly, for a packet of Traffic Flow 3 not passing through a low-speed link, the converted priority remains unchanged, the converted class is Class B, and the offset time for the deadline time is 0 cycle.

Figure 18A:
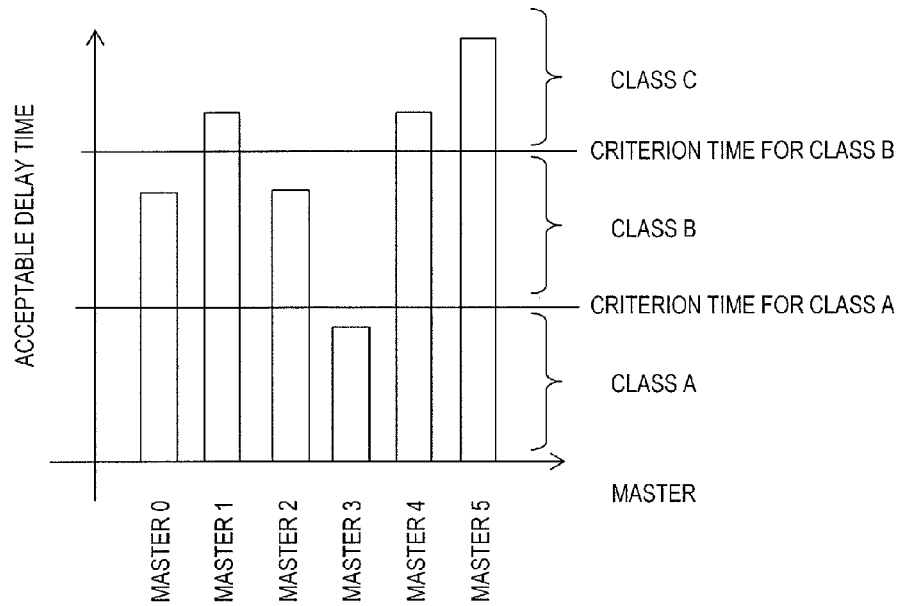
FIGS. 18A and 18B each show an example of how a designer determines the class after conversion based on the master's acceptable delay time and the transmission delay.
Figure 18B:
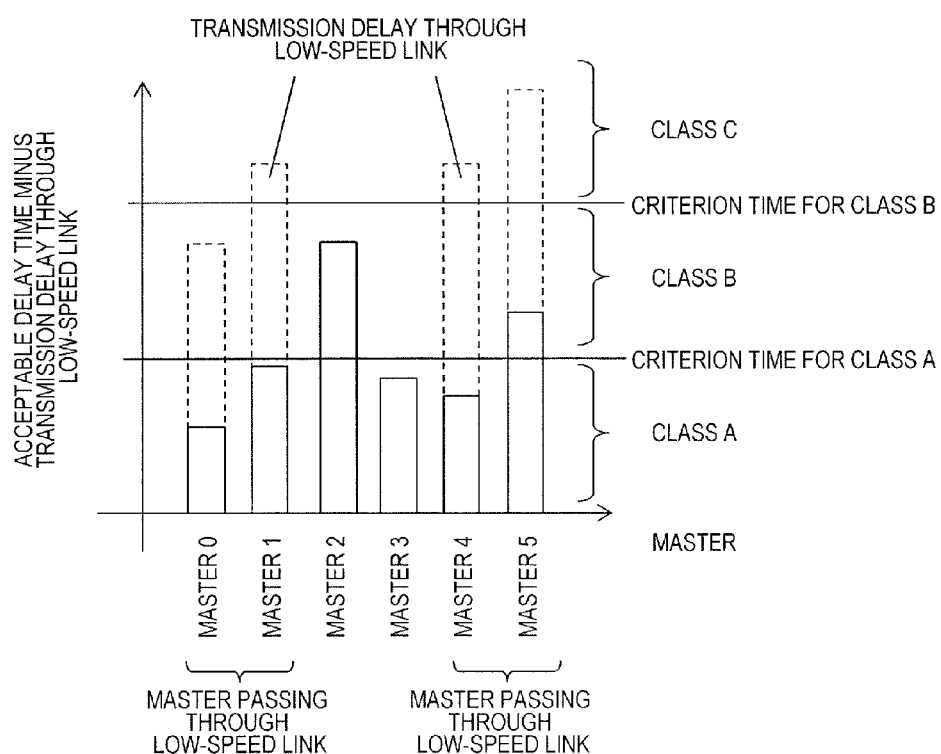

FIGS. 18A and 18B show examples where the designer determines the converted class based on the acceptable delay time and the transmission delay of the master.

FIG. 18A shows acceptable delay times required by masters, and a classification thereof. For example, based on the length of the acceptable delay time of each master, since that of Master 0 is shorter than the criterion time for Class B, Master 0 is classified as Class B, and Master 1, Master 2 and Master 3 are similarly classified as Class C, Class B and Class A, respectively.

FIG. 18B shows the classification after conversion, taking into consideration the delay time through a low-speed link. For example, now assume that Master 0 and Master 1 pass through a low-speed link whose transmission delay is 400 cycles, Master 2 and Master 3 do not pass through a low-speed link, and Master 4 and Master 5 pass through a low-speed link whose transmission delay is 500 cycles. Master 0 and Master 1 are classified as Class A because their acceptable delay times, after the transmission delay of the low-speed link is subtracted therefrom, are less than the criterion time for Class A. Master 2 and Master 3 are classified as Class B and Class A, respectively, as the classification is done based on their original acceptable delay times because they do not pass a low-speed link. Master 4 and Master 5 pass through a different low-speed link from Master 0 and Master 1, and Master 4 and Master 5 are classified as Class A and Class B, respectively, as a result of subtraction of the transmission delay time according to the low-speed link which they pass.

Figure 19A:
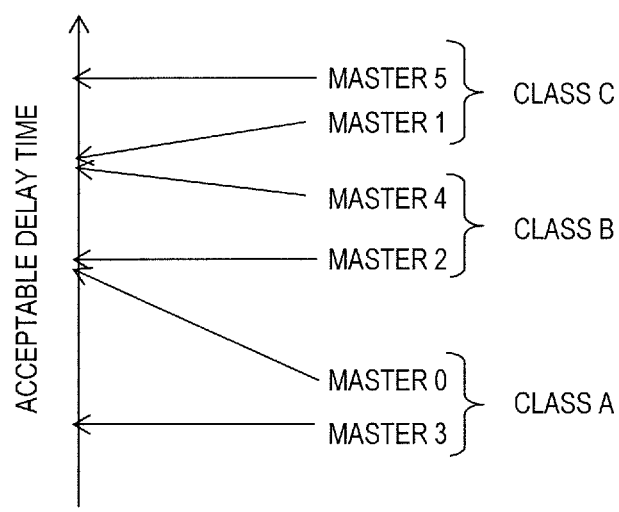
FIGS. 19A and 19B show an example of classification such that the number of masters of each class is brought closer to those of other classes, as another method for determining classes based on the acceptable delay time and the transmission delay of each master.
Figure 19B:
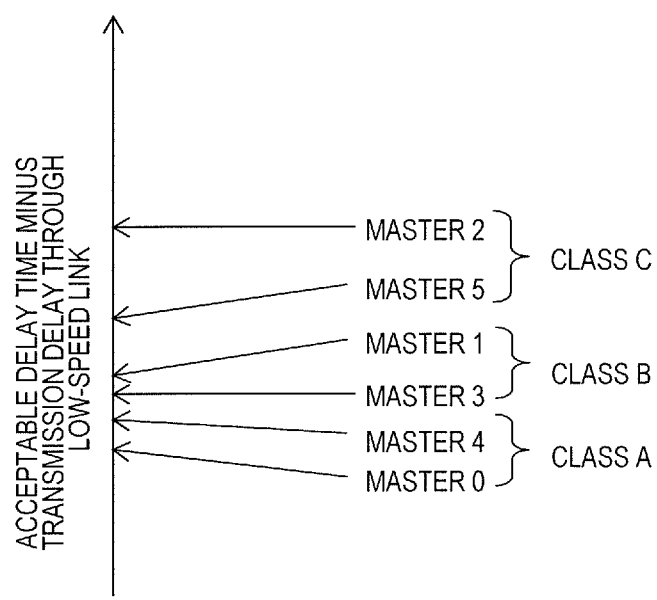

As another method for determining the class based on the acceptable delay time and the transmission delay of the master, FIGS. 19A and 19B show an example in which masters are classified so that the number of masters for each class is as even as possible. For example, where the number of classes is 3 and the number of masters is 6, FIG. 19A is a classification where the masters are arranged in the order of rigidity of acceptable delay time, and are classified, two by two, in classes of higher priorities starting from those with more rigid acceptable delay times. Here, the classification is done so that the number of masters for each class is as even as possible, but the classification may be done so that the amount of traffic flow to be sent from each class is as even as possible. FIG. 19B shows the classification after conversion, taking into consideration the delay time through a low-speed link. Based on the value of acceptable delay time obtained by subtracting the transmission delay time of the low-speed link from the acceptable delay time of each master (if the master passes through a low-speed link), the masters are arranged in the order of rigidity of acceptable delay time, and are assigned classes so that two masters are classified in each class. Note that the classification may be other than the methods described above, and the designer may analytically determine the classification based on the transmission delay, the required bandwidth and the transmission simulation so that the bus operation frequency can be kept low while ensuring the quality requirement of each class.

Figure 20:
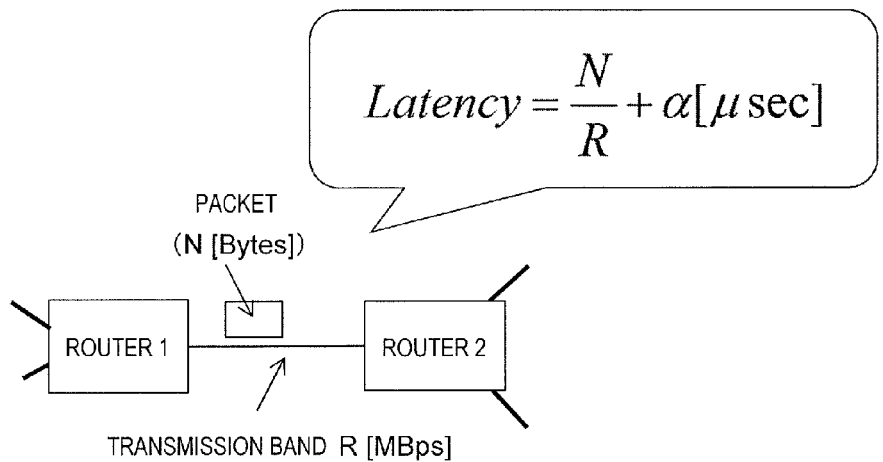
FIG. 20 shows a method for calculating the transmission delay of a low-speed link.

FIG. 20 shows a method for calculating the transmission delay (Latency) of a low-speed link.

The transmission delay of a low-speed link may be calculated by using a value obtained by dividing the data size of the packet by the transmission band of the low-speed link. Specifically, the transmission delay 'Latency' of a low-speed link may be calculated by the following expression, where Latency [μsec] denotes the transmission delay of the low-speed link, N [Byte] denotes the data size of the packet, R [MByte/s] denotes the transmission band, and α [μsec] denotes the amount of time required before the voltage signal on the path becomes stable as determined by the off-chip bus transmission characteristic.

$$Latency = N/R + \alpha$$

In order to take the transmission delay of the low-speed link into account, the offset time for the deadline time may be set to the value of the transmission delay of the low-speed link. That is, in practice, even if the same deadline time is set for a traffic flow passing through a low-speed link and another traffic flow not passing through a low-speed link, the traffic flow passing through a low-speed link is likely to arrive later by the transmission delay. When they merge together on the system bus, for packets passing through a low-speed link, the transmission delay of the low-speed link is taken into consideration for the deadline time, the conversion is done with an earlier deadline time, which is obtained by subtracting the transmission delay, and the transmission process is performed with a higher priority. Note that as off-chip bus examples may include transmission between LSIs stacked together in a three-dimensional implementation, transmission on a printed circuit board, transmission between printed circuit boards using a flexible printed circuit board, and transmission via an on-vehicle LAN (e.g., Ethernet). The factors for increasing the delay of the transmission characteristic may include those occurring from the transmission error rate and the number of resends on the transmission path (the quality of the transmission path dictated by transmission errors and resends). Typically, a transmission path having a high transmission error rate and a large number of resends is likely to have a high delay.

Figure 21:
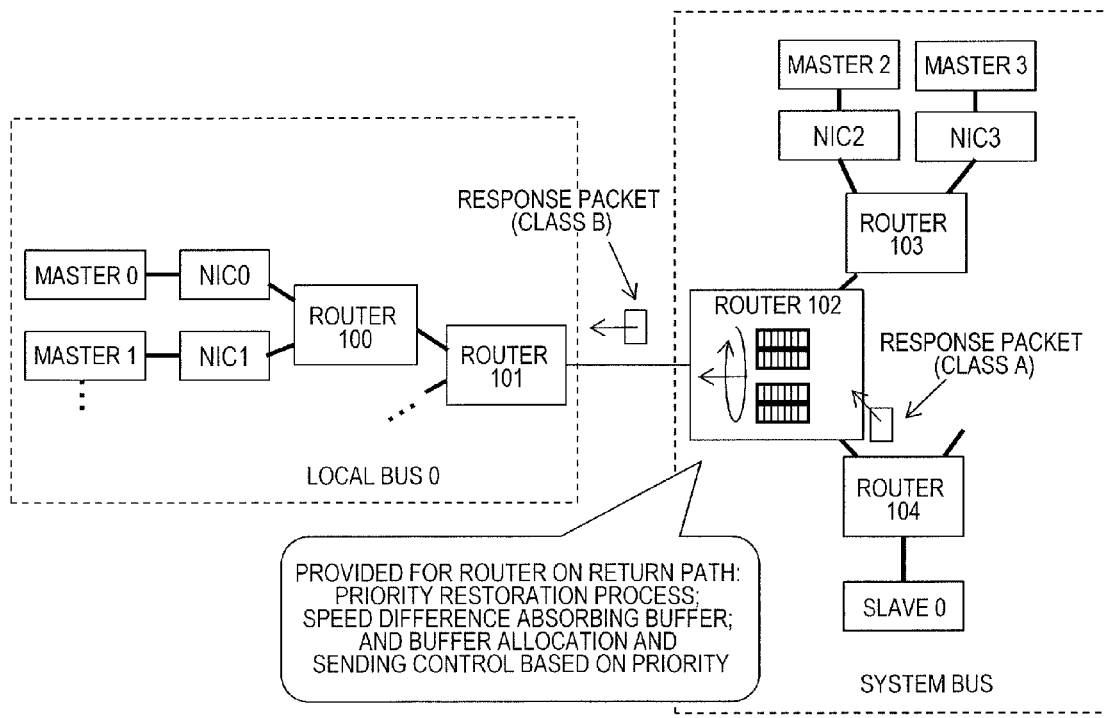
FIG. 21 shows a priority conversion process on a return path along which a response packet from a slave is transmitted.

FIG. 21 shows a priority conversion process on the return path along which a response packet is sent from a slave.

Note that the present embodiment is directed to a configuration where buses and routers are separated between the "outward path" along which packets are sent from masters to slaves and the "return path" along which response packets are sent from slaves to masters, but such separation may be absent and packets may be sent via the same routers for the outward path and for the return path.

Along the return path, the priority conversion is similarly performed by the router as with the outward path, so as to restore the priority as defined on the local bus. Thus, the transmission priority as defined on the system bus and the transmission priority as defined on the local bus can be changed to an optimal priority for each bus.

For example, a router 102 receives a response packet sent from Slave 0, and transmits the packet to a router 101 via a low-speed link. Now, when the router 102 receives the packet of Class A bound for Master 0, the buffer allocation and the sending control are performed while converting the class to Class B, as defined on the local bus, based on the priority conversion rule, as with the outward path. Also for the deadline time, a time obtained by adding the offset time of 400 to the deadline time attached to the packet is recorded in the packet, and the sending control is performed based on the converted deadline time.

Note that for the return path, in order to absorb the transmission rate difference when transmitting from a high-speed system bus to a low-speed link, a speed difference absorbing buffer may be provided in a router for converting the priority. Specifically, the buffers of the buffer have an amount of buffer capable of storing all the response packets bound for the same local bus that can simultaneously exist on the bus, based on the sum of the maximum numbers of packets that can be simultaneously sent from the masters arranged on the local bus which is the destination. This prevents packets that can no longer be transmitted to a low-speed link from staying for a long period of time in buffers of routers along the path, other than the speed difference absorbing buffer, and it is possible to suppress interference between traffic flows on the path during buffer allocation.

Note that the present embodiment has been described above with respect to an embodiment where the priority is restored on the return path, but when the number of memory elements is small, a plurality of packets to be transmitted may be transmitted with the same priority without using the priority (class and deadline time) on the return path, by providing a sufficiently large transmission band for the bus on the return path. On the outward path, if the number of memory elements is small, a plurality of packets sent from a large number of masters are likely to localize in a small number of relay devices near the slave, and the interference between packets is likely to be significant. Therefore, a significant effect can be obtained when transmitting with the priority determined while taking into consideration the delay on a low-speed link. On the return path, on the other hand, packets sent from slaves are less likely to localize in particular relay devices, and it is therefore possible to suppress the interference between packets without providing a sufficiently large transmission band and without transmitting based on the priority. Therefore, on the return path, the priority conversion does not need to be performed.

Figure 22B:
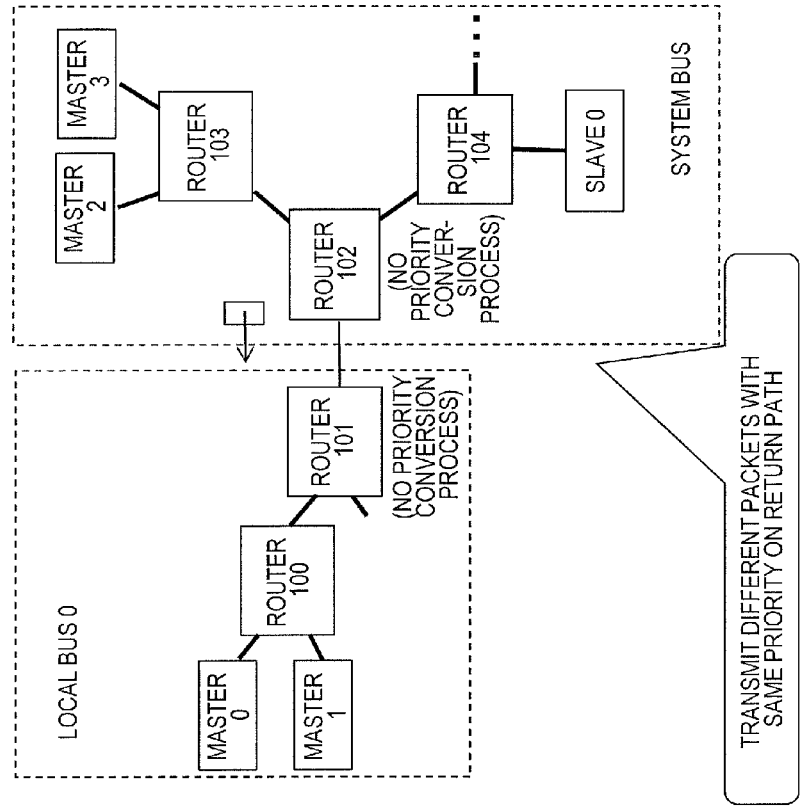
FIGS. 22A and 22B show an example where the outward path and the return path use different priority conversion processes.
Figure 22A:
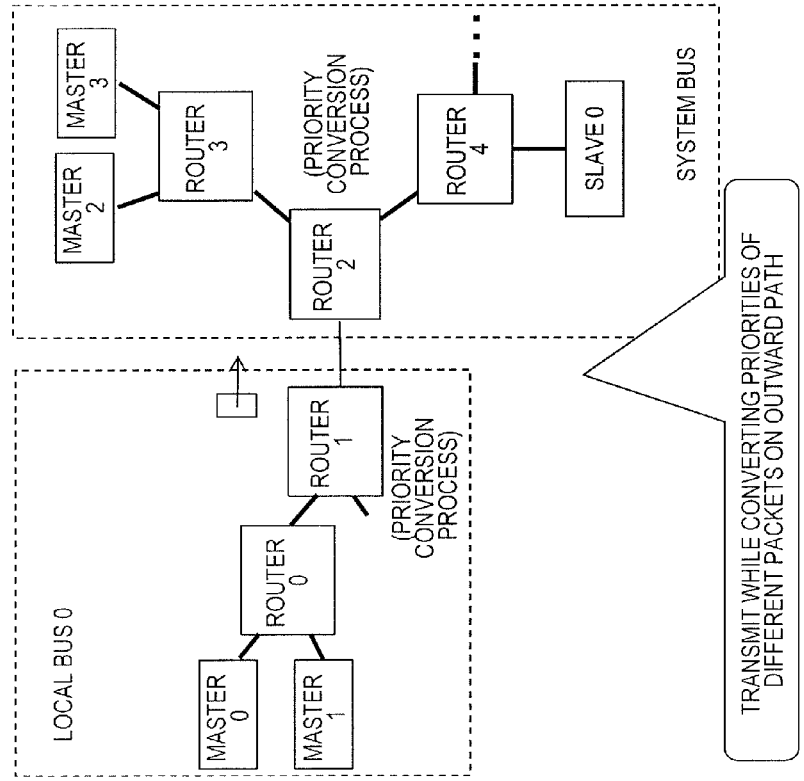

For example, FIGS. 22A and 22B show an example where the priority conversion process differs between on the outward path and on the return path. As shown in FIG. 22A, on the outward path, the priority conversion is performed at routers on the path while taking into consideration the delay of the low-speed link. As shown in FIG. 22B, on the return path, the priority conversion and the transmission based on the priority do not need to be performed. Thus, by transmitting the packets with the same priority without providing relay devices for performing the priority conversion on the return path, it is possible to more simply implement the relay devices on the return path.

(Variation 1)

In the bus system 100 of the embodiment described above, the priority conversion is performed based on the priority conversion rule at a router for reassigning the priority. Another embodiment will now be described, in which converted priorities are set in advance at the NIC 200, and the router reassigns the priority using the converted priority attached to the packet.

Where converted priorities are set in advance at the NIC 200, a converted priority and an unconverted priority as defined on the local bus are both attached to a packet to be sent, so that the router for reassigning the priority performs the transmission process based on the attached converted priority. Then, at the router, it is possible to reassign the priority while saving the circuit area and the process time for performing the priority conversion process, and the priority for the off-chip bus and the priority for the on-chip bus can both be changed only by setting the NIC 200 on the off-chip side.

FIG. 23 shows an example configuration of a packet to which a converted priority is attached.

A packet to which a converted priority is attached has a configuration obtained by adding the "converted class" and the "converted deadline time" to the configuration of a packet of the embodiment described above.

FIGS. 24A to 24C show examples of packets shown in FIG. 23 as configured with information actually obtained from masters.

For example, FIG. 24A is a packet of Master 0 passing through a low-speed link, wherein the destination ID of the slave to be the destination of the packet is set to be 0, the master ID of the sender is 0, the class as defined on the local bus is Class B, the deadline time for the response packet to arrive at the master of the sender is 500, the converted class is Class A, and the converted deadline time is 100.

Similarly, in FIG. 24B, the destination ID is set to be 0, the master ID is 1, the class as defined on the local bus is Class C, the deadline time for the response packet to arrive is 700, the converted class is Class A, and the converted deadline time is 300. Since Master 0 and Master 1 pass through the same low-speed link, the offset time used for the conversion of the deadline time is calculated with the same transmission delay time of 400 cycles.

FIG. 24C is a packet of Master 2 not passing through a low-speed link, wherein the destination ID is set to be 0, the master ID is 2, the class as defined on the local bus is Class B, the deadline time for the response packet to arrive is 550, the converted class is Class B, and the converted deadline time is 550. Note that since Master 2 does not pass a low-speed link, the class and the deadline time are not changed by conversion.

Note that although the unconverted priority as defined on the local bus and the converted priority are both attached to the packet at the NIC 200, only the converted priority may be attached without attaching the former. In such a case, the transmission process needs to be performed with the converted priority on the local bus, and the transmission may become inefficient. Specifically, since the classification will no longer enable optimal transmission on the local bus, it is necessary to provide an excessively large transmission band for the local bus in order to ensure the quality requirements of the masters. However, since only the converted priority is attached to the packet, each router does not need to perform the conversion process while choosing a priority. Therefore, it is possible to suppress the circuit area required for the process.

Figure 25:
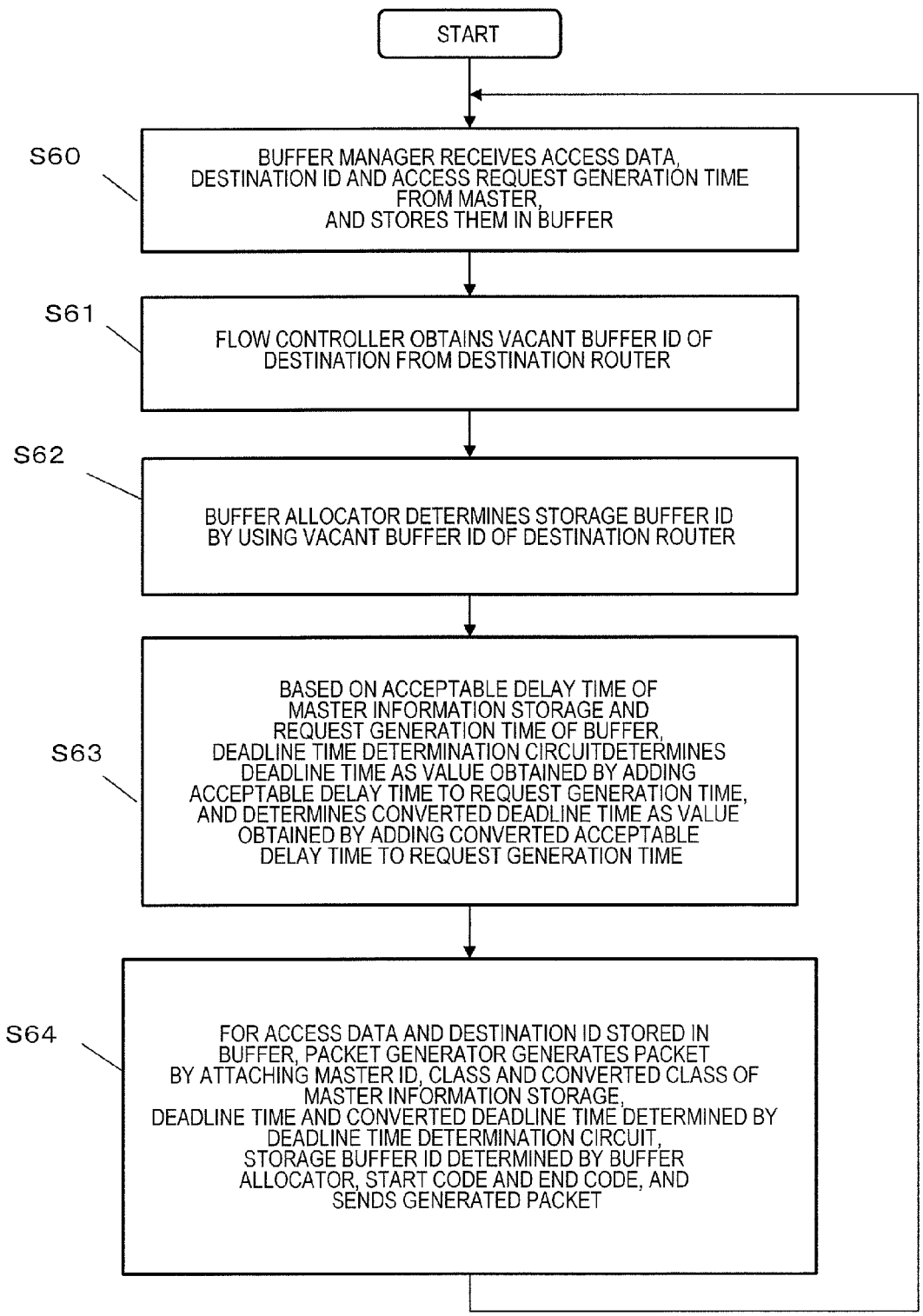
FIG. 25 is a flow chart showing an operation procedure of the NIC 200 for generating a packet to which the converted priority is attached.

FIG. 25 shows an operation flow of the NIC 200 for generating a packet to which the converted priority is attached.

Steps S63 and S64 are the difference from the operation flow (FIG. 7) of the NIC 200 of the embodiment described above. That is, in step S63, the deadline time determination circuit determines the converted deadline time as a value obtained by adding the converted acceptable delay time to the request generation time. In step S64, the packet generator obtains the converted class from the master information storage 205 and obtains the converted deadline time from the deadline time determination circuit so as to generate a packet by attaching the obtained converted class and deadline time to the packet.

FIG. 26 shows a configuration of the master information storage for generating a packet to which the converted priority is attached.

A difference from the configuration of the master information storage (FIG. 8) of the embodiment described above is that the converted class and the converted acceptable delay time are provided. Based on these information, the packet generator obtains the converted class, and the deadline time determination circuit determines the converted deadline time.

Note that in the present embodiment, the master information storage has the converted acceptable delay time in order to obtain the converted deadline time, but it may have an offset time value used for conversion, rather than the converted acceptable delay time. In such a case, the converted acceptable delay time may be calculated, at the deadline time determination circuit of the NIC 200, as a value obtained by subtracting the offset time from the acceptable delay time, based on the acceptable delay time and the offset time of the master information storage.

Figure 27:
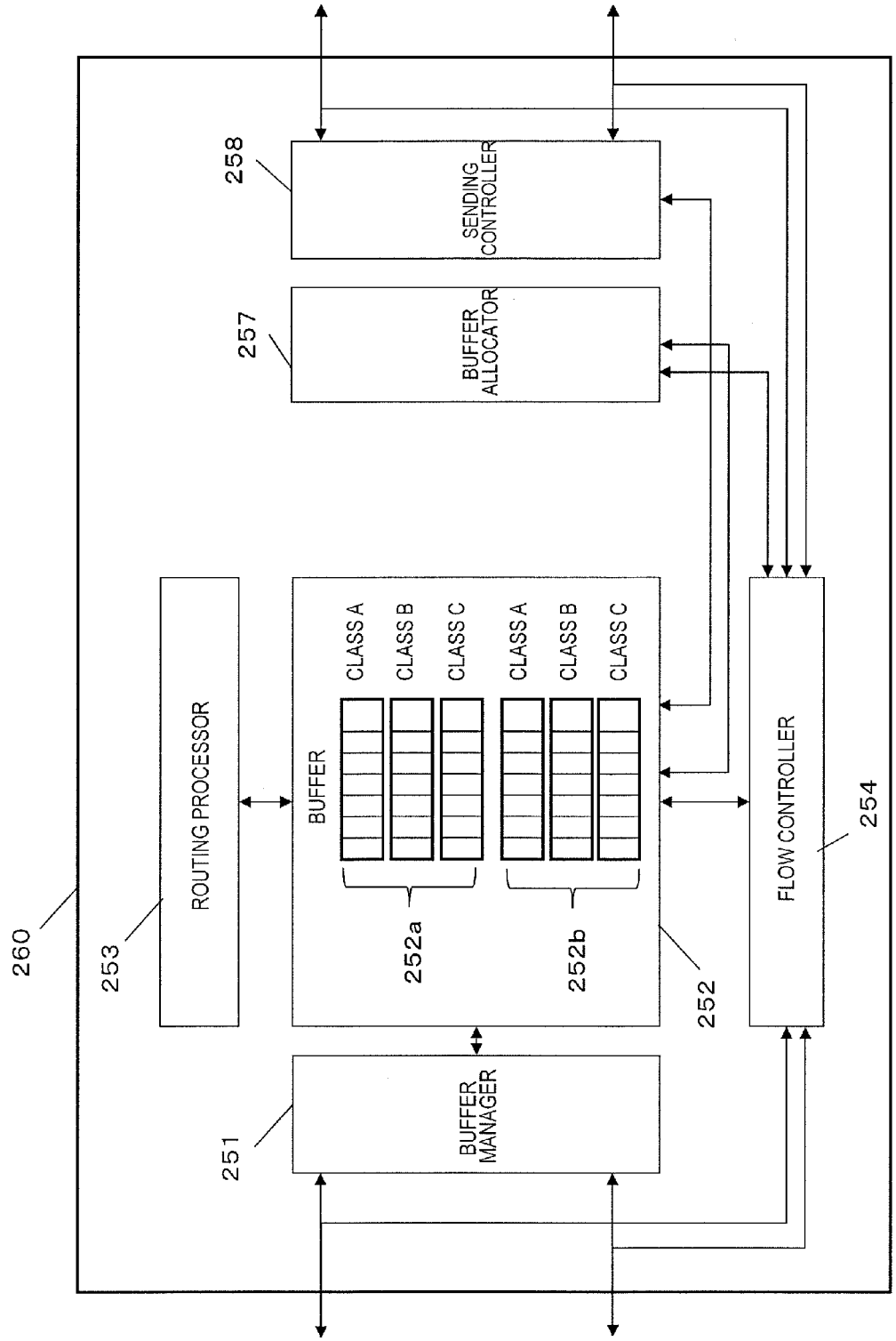
FIG. 27 shows a configuration of a router 260.

FIG. 27 shows a configuration of a router 260.

A difference from the configuration of the router 250 (FIG. 10) of the embodiment described above is that the router 260 is not provided with the priority converter 255 and the storage 256. This is because the router 260 of the present embodiment does not need to perform the priority conversion based on the priority conversion rule.

Note that a register may be provided for switching between positions at which the priority is read out from a packet, in order to implement a router arranged on an off-chip bus and a router arranged on an on-chip bus by using a router of the same configuration as that of a priority switching router. Specifically, a read-switching register may be provided in the buffer allocator 257 and the sending controller 258 so as to selectively read out the unconverted priority of the packet or the converted priority depending on the value of the register. As for the method for setting the registers, for example, they may be fixedly set at the startup of the bus system 100, or signal lines for the registers may be routed across the bus system 100 so that the settings are done by a processor writing setting values to the registers via the signal lines.

Figure 28:
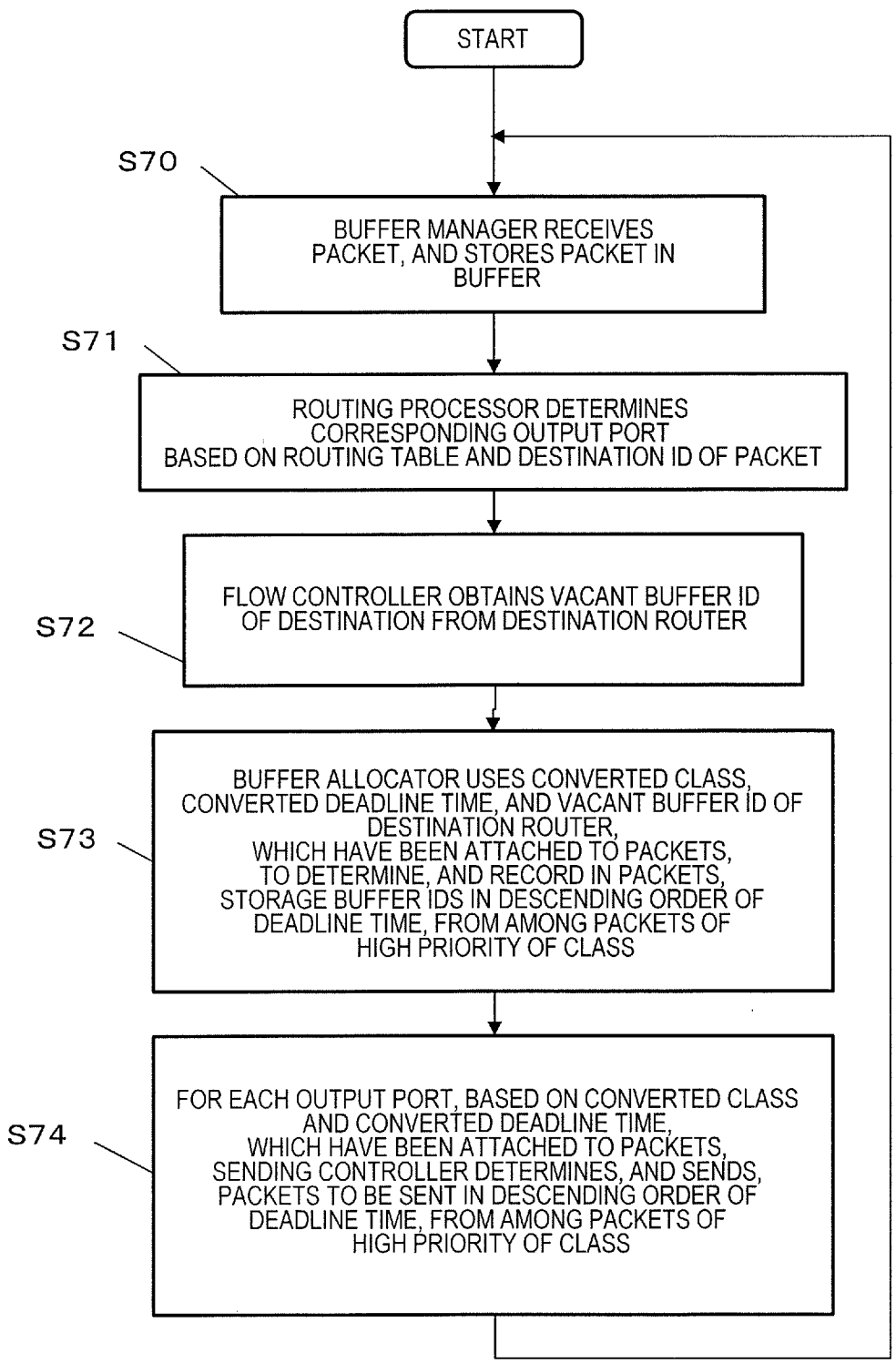
FIG. 28 is a flow chart showing an operation procedure of the router 260.

FIG. 28 shows an operation flow of the router 260.

First, a difference from the operation flow (FIG. 11) of the router 250 of the embodiment described above is that the process (step S23) in which the priority converter 255 performs the priority conversion, and the process (step S24) in which the priority converter 255 records the converted deadline time in a packet are not performed. Another difference is that steps S25 and S26 of FIG. 11 are changed to steps S73 and S74 in FIG. 28. Specifically, the information of the "converted class" and the "converted deadline time" in steps S25 and S26 of FIG. 11 are obtained from the packet stored in the buffer by the buffer allocator and the sending controller in FIG. 28.

Figure 29:
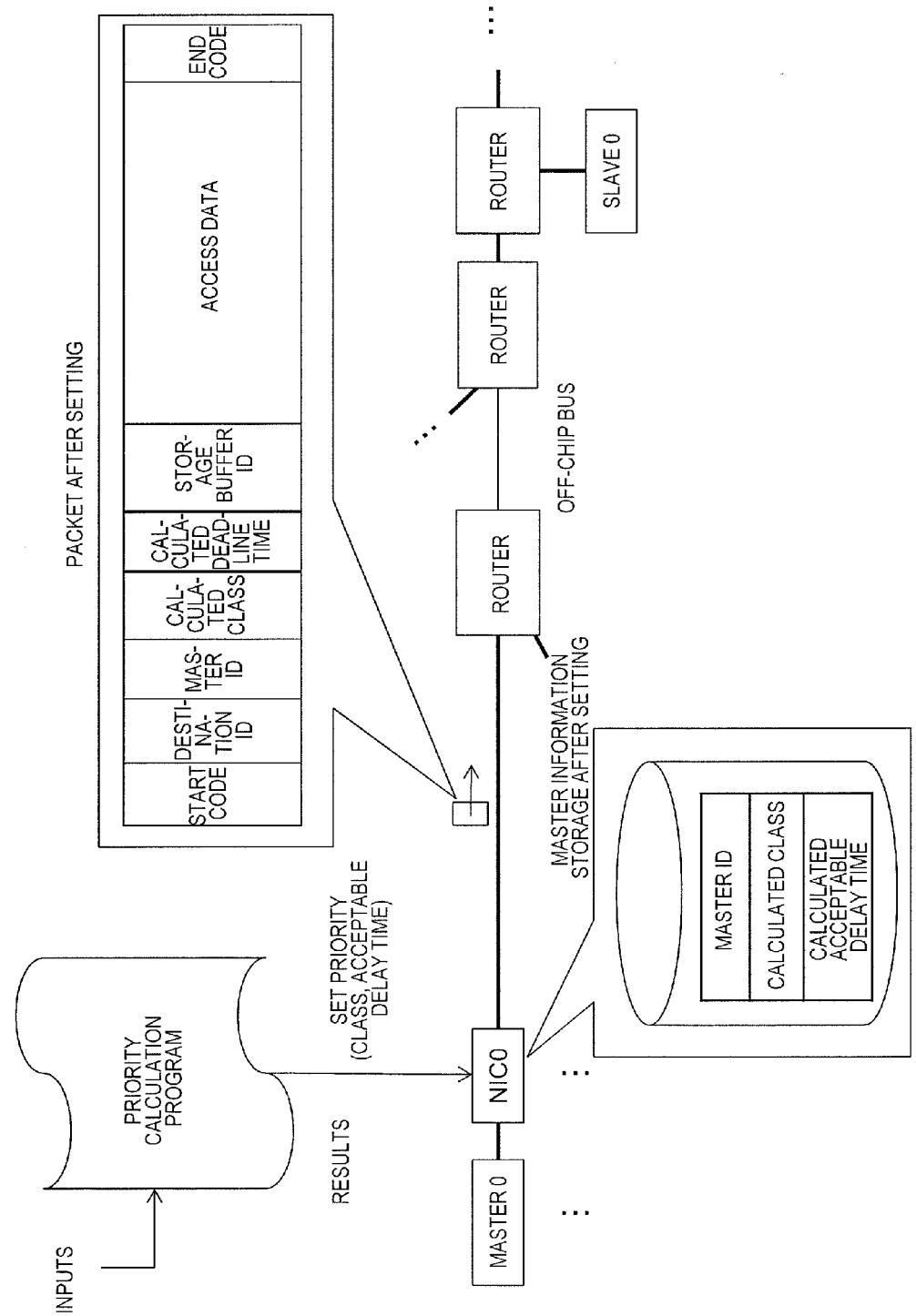
FIG. 29 shows a method for setting a converted priority in the NIC by using a computer program in a bus system according to an example embodiment.

FIG. 29 shows a method for setting a converted priority in an NIC by using a computer program in the bus system of the present embodiment. This computer program is utilized in the designer's development environment when designing the bus system. In the present specification, it is assumed that the designer executes the program on a PC. The converted priority obtained as a result of the execution is set in the NIC. Note that the present embodiment is directed to an embodiment where the program is executed by a PC of the designer. This is merely illustrative, however, and does not intend to exclude other methods. For example, the same priority conversion calculation may be performed by other methods such as manual calculation.

Figure 30:
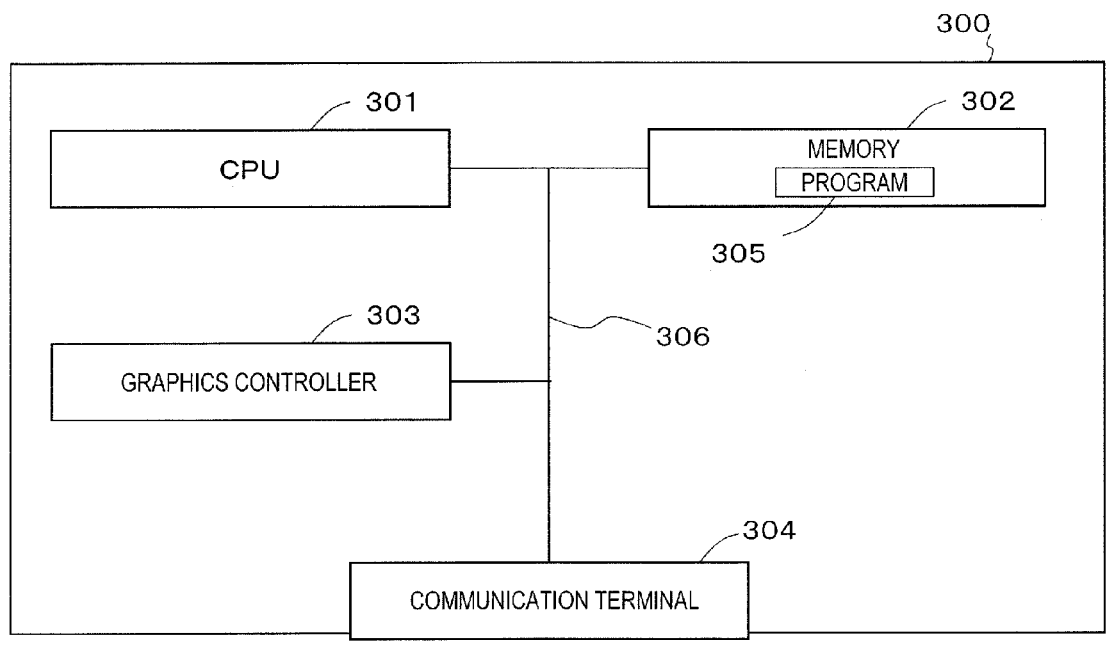
FIG. 30 shows a hardware configuration of a PC 300 of the designer.

FIG. 30 shows a hardware configuration of a PC 300 used by the designer. The PC 300 includes a CPU 301, a memory element 302, a graphics controller 303, and a communication terminal 304. These components are communicably connected with one another via a bus 306. The memory element 302 stores a priority calculation program 305.

The CPU 301 is an arithmetic circuit for executing the priority calculation program 305.

The memory element 302 is a RAM, for example. In the beginning, the priority calculation program 305 is stored in a storage device (not shown) such as a hard disk drive. The CPU 301 reads out the priority calculation program 305 from the storage device, and loads it onto the memory element 302.

The graphics controller 303 generates video signals for displaying calculation results, etc., on a display device (not shown).

The communication terminal 304 is a terminal for connecting the system shown in FIG. 29 with the PC 300, for example.

The CPU 301, running the priority calculation program 305, calculates the converted class and the converted acceptable delay time based on instructions defined in the priority calculation program 305. Then, the obtained class and acceptable delay time are set in the master information storage of each NIC via the communication terminal 304. Based on the class and the acceptable delay time which have been set, each NIC determines the converted class and the converted deadline time so as to attach the converted class and the converted deadline time to a packet and send the packet.

Figure 31:
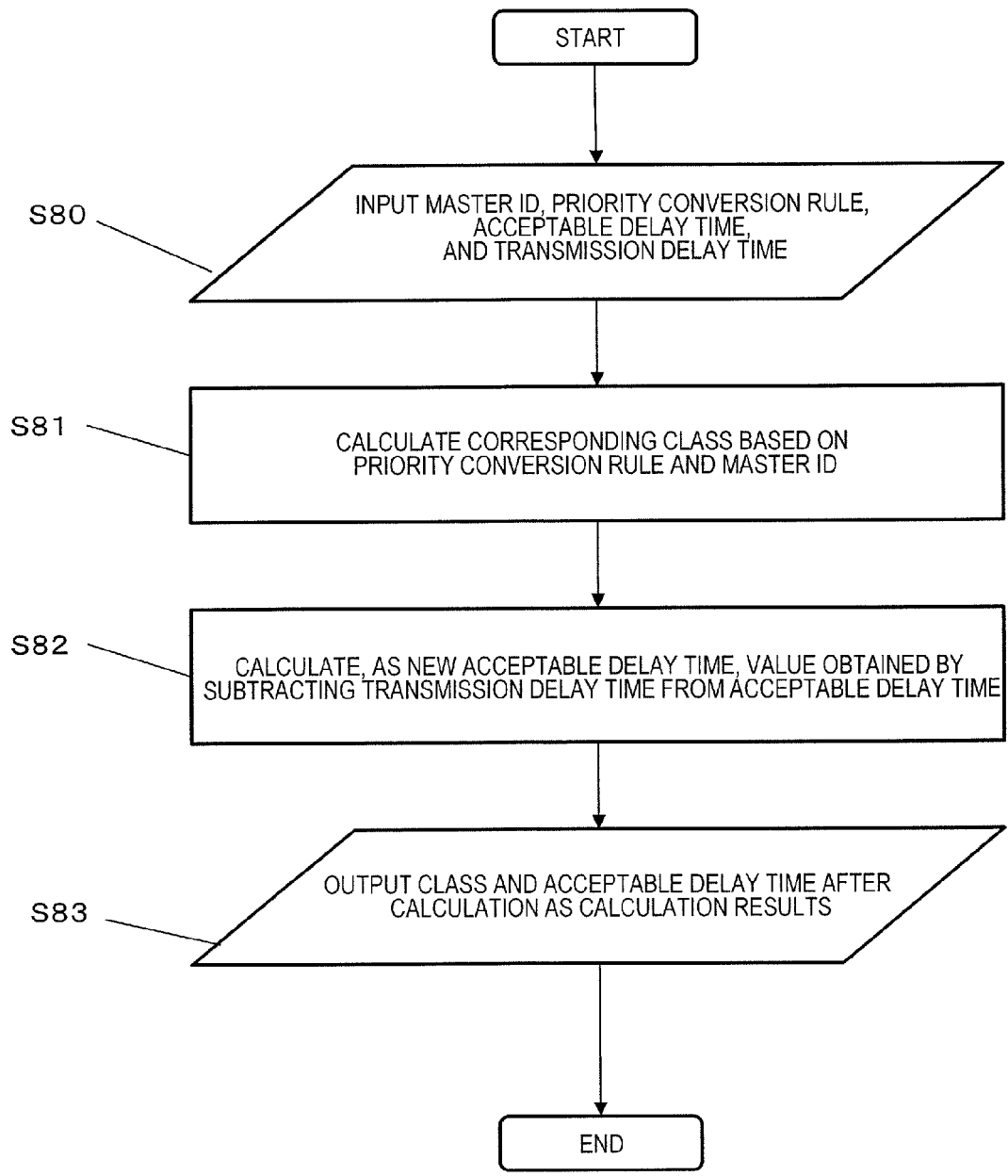
FIG. 31 is a flow chart showing a process procedure of a priority calculation program.

FIG. 31 shows a process flow of the priority calculation program.

In step S80, the CPU 301 waits for inputs, from the designer, of the master ID, the priority conversion rule, the acceptable delay time, and the transmission delay time. In step 81, the CPU 301 calculates the corresponding class based on the priority conversion rule and the master ID. The CPU 301 calculates the new acceptable delay time as a value obtained by subtracting the transmission delay time from the acceptable delay time. The CPU 301 outputs, as calculation results, the calculated class and acceptable delay time. The above may be implemented as a design tool.

(Application 1)

An application of the bus system according to the example embodiment of the present invention to an actual device will now be described.

Figure 32:
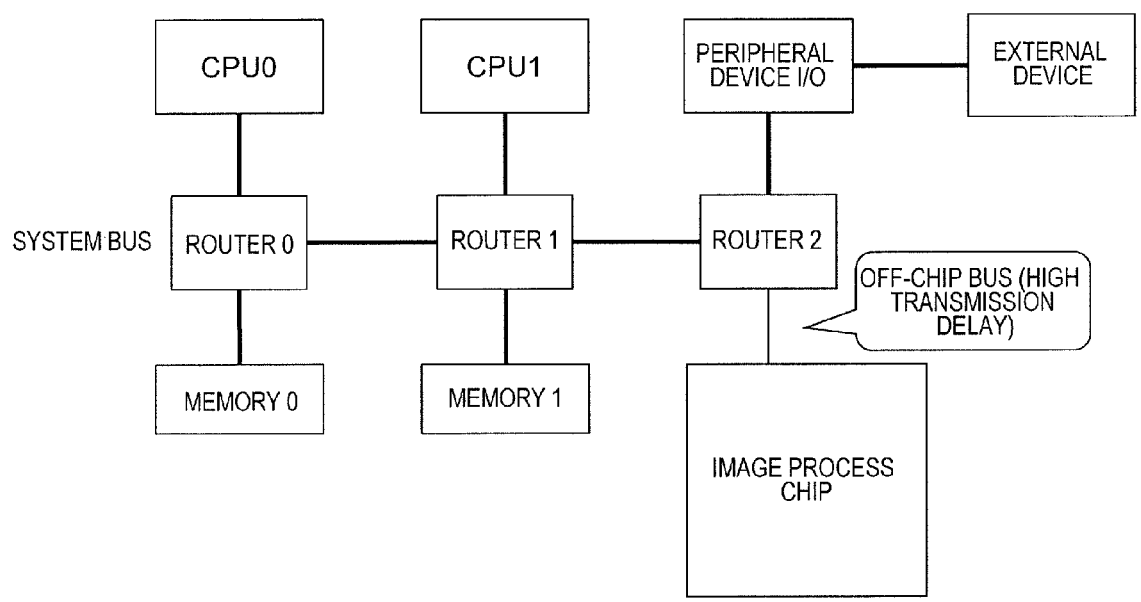
FIG. 32 shows an example of developing a chip for image recognition while using, as a combination, an image processing external chip.

FIG. 32 shows an example where a chip for image recognition is being developed while using an image processing external chip in combination. A master responsible for image processes is present off-chip, and two processor (CPU) masters, a master responsible for input and output (I/O) with peripheral devices, and two memory elements are connected on-chip via a networked bus. The image process chip is an external chip, and is therefore connected via a low-speed off-chip bus.

A semiconductor chip for image recognition has a wide range of applications, including face recognition of digital cameras, automobile driving support, human/object tracking of outdoor surveillance cameras, etc. On the other hand, the content of process of an image process engine needs to be changed frequently as the object of process and the process algorithm are changed. In order to efficiently develop semiconductor devices in such a situation, a possible method is to provide module portions accounting for image recognition in the form of external chips, and to develop semiconductor devices by combining the chips with one another. For example, it is possible to develop efficiently by re-creating the image process chip when changing the content of process, while re-creating the main chip including the system bus without re-creating the image process chip when changing the model.

By applying the bus system according to the example embodiment of the present invention, it is possible to set the priority while selecting a chip to be changed when it is combined with other chips, thus enabling efficient development. For example, when re-creating the off-chip side, the setting of the router for converting the priority can be changed on the off-chip side, and when re-creating the main chip including the system bus, the setting of the router for converting the priority can be changed on the main chip side. Then, the converted priority can be set so that the transmission priority for the image process packet will be a higher priority, taking into consideration the transmission delay, depending on the transmission rate and the wiring length of the off-chip bus to be a low-speed link. Thus, it is possible, for various chip combinations, to set the priority without lowering the transmission performance for off-chip packets.

(Other Examples)

Figure 33:
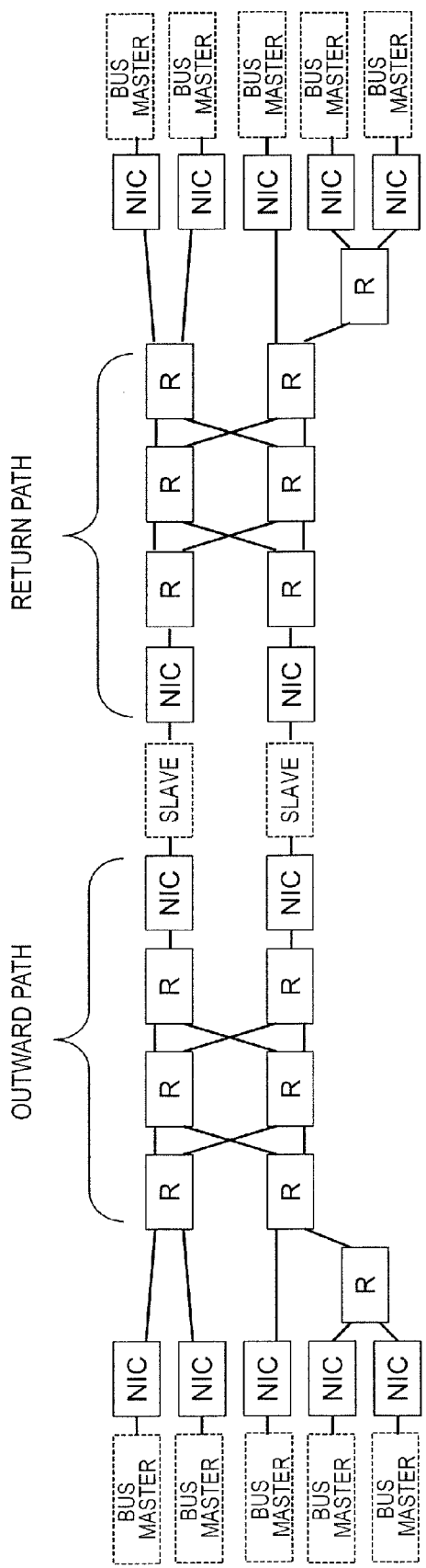
FIG. 33 shows a configuration example of a system bus in which the outward path and the return path are separated from each other.

FIG. 33 is a configuration example of a system bus in which the outward path and the return path are separated from each other. For the sake of simplicity, the outward path and the return path are physically separated from each other in the figure. In practical use, the outward path and the return path are arranged close to each other. While the outward path and the return path are implemented as a butterfly network, each path having a similar network configuration, in the illustrated example, the outward path and the return path may have different network configurations.

As shown in the figure, since the transmission paths of the outward path and the return path are separated from each other, traffic flows do not interfere between the outward path and the return path. For communications between masters, however, since all masters needed to communicate via slaves (memory elements) provided on the system bus, the transmission delay is likely to become large due to load localization in the slaves and an increase in the relay processing in the routers.

An example will now be described, in which masters directly communicate with each other between local buses via the system bus or within a local bus, with no slave of the system bus interposed therebetween. Then, it is possible to reduce the transmission delay and to suppress load localization at the memory elements of the system bus.

The embodiment described above is directed to an embodiment where routers performing the priority conversion are applied, for two types of paths. The two types of paths are: the path of an outward-path bus extending from a master and passing through a local bus and the system bus in this order to arrive at a slave; and the path of a return-path bus extending from a slave and passing through the system bus and a local bus in this order to arrive at a master. As another example related to the embodiment described above, the router of the present embodiment may be applied to a master-to-master communication path extending from a master passing through a local bus and the system bus in this order to again pass through a local bus to arrive at a master, instead of arriving at a slave.

Figure 34:
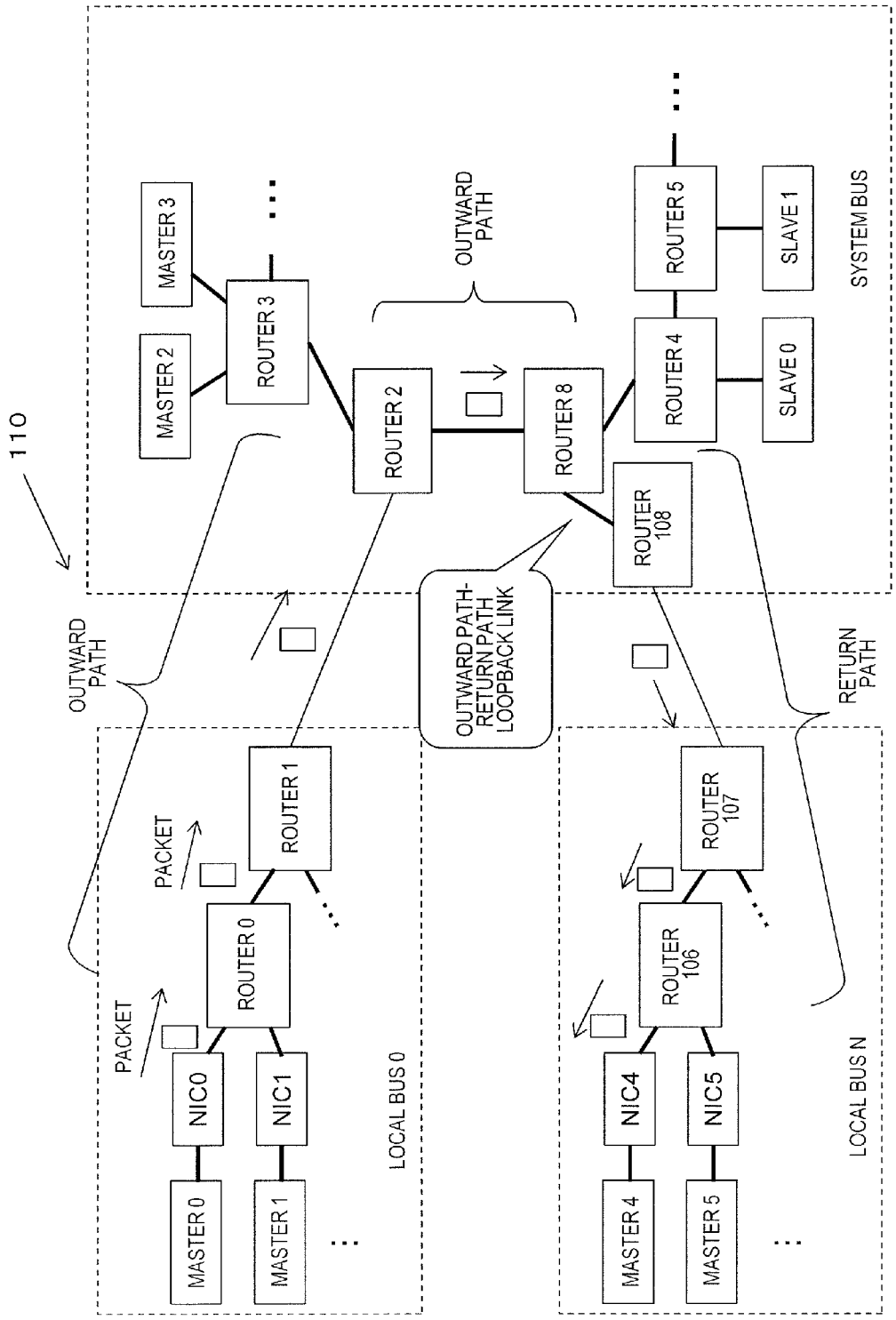
FIG. 34 shows an example of a bus system 110, in which an example embodiment is used for master-to-master communication via a low-speed link.

FIG. 34 shows an example of the bus system 110 where the present embodiment is applied to master-to-master communication passing through a low-speed link. In FIG. 34, the link between Router 1 and Router 2 and the link between a router 107 and a router 108 are low-speed links having relatively low transmission rates within the bus system.

With master-to-master communication passing through a low-speed link, in order to allow a packet passing through a low-speed link to be transmitted with a higher priority on the system bus, the priority of the packet is converted to a higher priority when it is transmitted onto the system bus. When a packet is transmitted again from the system bus to another local bus, it is transmitted while converting the priority to the priority as defined on the other local bus, which is the transmission destination.

Now, for example, consider a packet sent from Master 0 of Local Bus 0. Assume that Master 4 of Local Bus N is attached to this packet as the destination ID. When this packet is transmitted by Router 1 or Router 2, the priority is converted to a higher priority taking into consideration the delay along a low-speed link. Then, the packet is transmitted. When the packet passes through Router 8 via Router 2, it is transmitted to the router 108 on the return-path side through a loopback link between the outward path and the return path, which is provided for master-to-master communication.

Note that for buses separated between the outward path and the return path, a loopback link connects between the sending controller of the outward-path-side router (e.g., Router 8) and the buffer manager of the return-path-side router (e.g., the router 108), which routers connect between the system bus and local buses, thereby allowing a packet to loop back from the outward path onto the return path at a certain point along the path without being transmitted from a slave. Also with master-to-master communication within the same local bus for buses separated between the outward path and the return path, if a packet travels via the loopback link described above, at least one loopback link can be provided for each local bus while suppressing the interference with other packets passing through the system bus. Therefore, it is possible to provide a loopback path for master-to-master communication with fewer resources.

When the packet is transmitted to the router 108 on the return path side via the loopback link, the priority is converted to the priority as defined by the quality requirement of Local Bus N, which is the transmission destination. Then, the packet is transmitted. Specifically, the class is converted to the class defined according to the rigidness of the quality requirement of the master arranged on Local Bus N. For the deadline time, it is transmitted with a lower priority by adding the transmission delay while taking into consideration of the transmission delay of the low-speed link between the router 108 and the router 107. Note that on the return path side, if the transmission band of the bus is sufficiently large, and the effect obtained from transmission control based on priority is small on a local bus of the return path, the priority conversion does not have to be performed on the return path.

(Example of Priority Conversion in Cascaded Bus System)

The embodiment described above is directed to an embodiment where the priority is converted between a local bus and the system bus, but routers for converting priorities may be used in multiple stages in a bus system where a plurality of local buses are cascaded via low-speed links.

Figure 35:
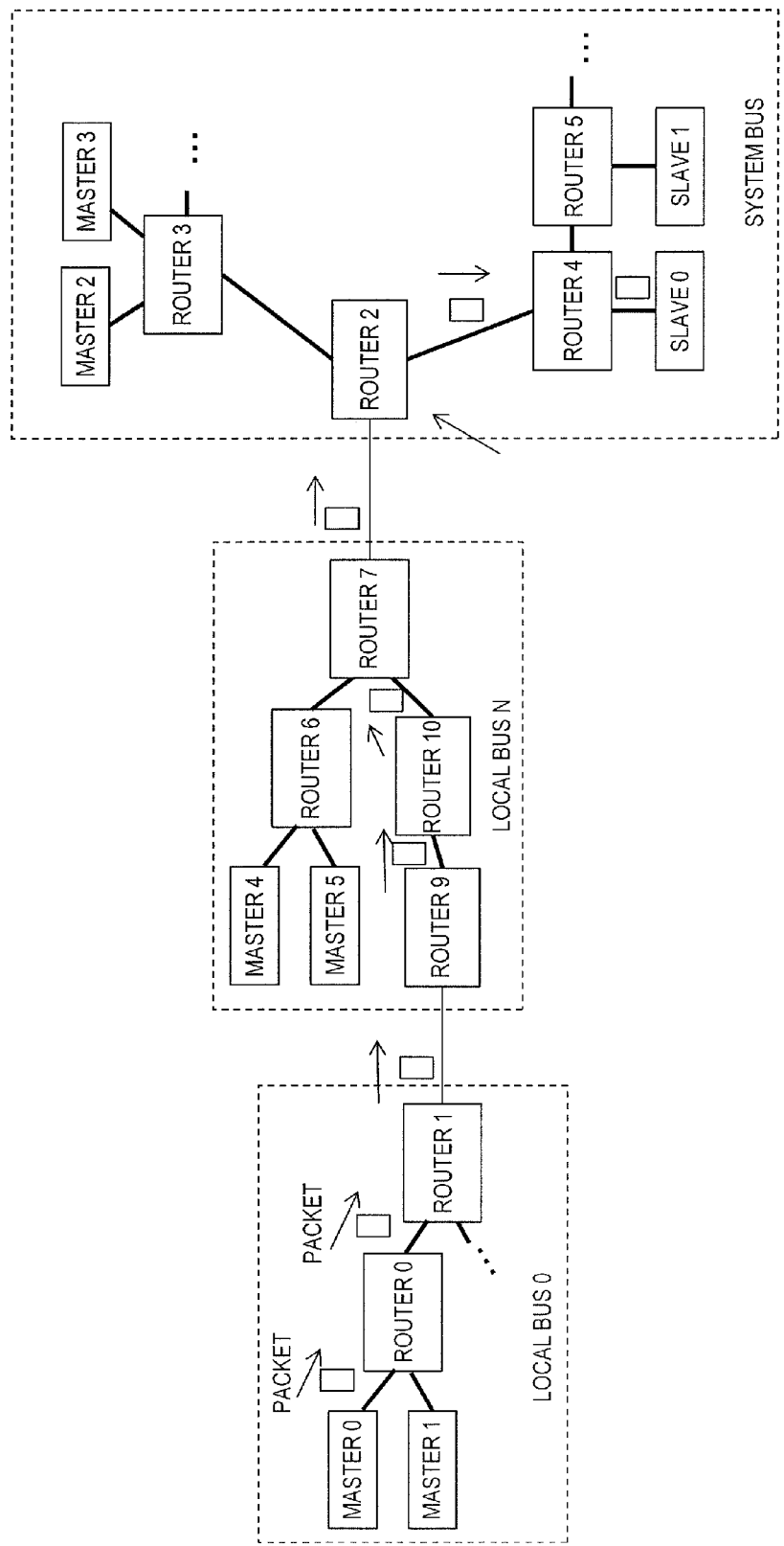
FIG. 35 shows an example in which a plurality of local buses are cascaded together via low-speed links.

FIG. 35 shows an example where a plurality of local buses are cascaded via low-speed links. In such a case, the priority conversion may be performed also between local buses, as well as the priority conversion between the local bus and the system bus of the embodiment described above. In the illustrated example, the priority conversion may be performed between Router 1 and Router 9, and the priority conversion may further be performed also between Router 7 and Router 2.

For example, the same packet can be transmitted while switching between the priority as defined on Local Bus 0, the priority as defined on Local Bus N, and the priority as defined on the system bus. Then, the priority (the class and the deadline time) may be converted to a higher priority, taking into consideration the transmission delay of low-speed links between local buses and between a local bus and the system bus. For example, for transmission from Router 1 of Local Bus 0 to Router 9 of Local Bus N, the priority is converted to a higher priority based on the transmission delay of a low-speed link between Local Bus 0 and Local Bus N. For transmission from Router 7 of Local Bus N to Router 2 of the system bus, the priority is converted to an even higher priority based on the transmission delay of another low-speed link between Local Bus N and the system bus.

(Example where Priority on System Bus Side is Lowered Relatively)

While the transmission process is performed while converting the priority of a packet passing through a low-speed link so that the priority after conversion is higher than the priority before conversion in the embodiment described above, the priority of a packet passing through a low-speed link may be increased relatively by lowering the priority of packets not passing through low-speed links.

FIG. 36 shows a priority conversion rule where the priority of a packet not passing through a low-speed link is lowered. For example, for Master 0 passing through a low-speed link, the priority (the class and the deadline time) is not changed, so that the class remains unchanged at Class B, and the offset time for the deadline time is 0. For Master 2 not passing through a low-speed link, the priority (the class and the deadline time) is lowered, so that it is converted from Class B, which is the original class, to Class C, which is a lower priority. The offset time for the deadline time is "−450", and "−450" is subtracted from the deadline time, i.e., the deadline time is set to be a later time by adding "450", thus converting the priority to a lower priority. Thus, the priority of a packet passing through a low-speed link may be converted to be relatively higher by converging the priority of packets not passing through low-speed links to be lower.

(Variation 2: Case (B) where Bus Transmission Performance Varies Due to Variations in Node Process Performance)

The embodiment described above is directed to an embodiment where a packet passing through a low-speed link and a packet not passing through a low-speed link are distinguished from each other, and the priority of a packet passing through a low-speed link is converted to a relatively higher priority based on the delay time of the low-speed link, thereby maintaining a high level of transmission performance (Case (A)). On the other hand, the present embodiment is directed to an embodiment in which where packets passing through a relay device all pass through the same low-speed link, the priority is converted so as to maintain a high level of transmission performance (Case (B)).

Note that in the present embodiment, a bus having a high delay or a small throughput are called a "low-speed link", and a bus is called a low-speed link not only because of the delay time required for transmission along the bus, but a bus is also called a low-speed link if the delay time (throughput) of a node directly connected to the bus is relatively higher (smaller) than other nodes due to the lower level of process performance of the node connected to the bus. Specifically, since a node of a memory device such as a DRAM has a significantly larger delay time, from reception of access data until sending of a response, than other nodes (e.g., a router), a bus connected to a memory device is included as a low-speed link. For example, a memory device has a larger process delay as compared with a router since a process such as bank switching is involved. While the present embodiment is directed to a link (Case (B)) connected to a node of a low level of process performance, the present disclosure can be applied similarly to a high-delay link of Case (A). Moreover, low-speed devices such as I/O may also be included, as well as memory devices. A "relay device" refers to any node that receives data via a bus and sends the received data, and a memory controller for extracting data from the received packet so as to control the order in which data is sent to a memory device may also be included as a relay device.

Where all the packets transmitted to a relay device pass through the same low-speed link, it is possible to maintain a higher level of transmission performance by converting the priority by the unit of masters rather than by the unit of classes. First, different masters in a semiconductor device exchange data with memory elements with different levels of quality requirement (delays and throughputs to be guaranteed). If the relay device performs the transmission using the class and the deadline time, it is necessary to provide a sufficiently large transmission band in order to ensure these levels of quality requirement. On the other hand, when passing through a low-speed link whose processing capacity is low, such as a memory device, the amount that can be processed per a certain period of time is limited even if the transmission rate of the bus is increased. Therefore, when the transmission is performed by using priorities of the class and the deadline time, it may be no longer possible to guarantee the acceptable delay and the required throughput for different masters. Therefore, in order to ensure the required level of performance for each master, the memory controller needs to convert the priority for each master rather than for each class, and also to perform the transmission process while controlling the sending rate for each master.

Figure 37:
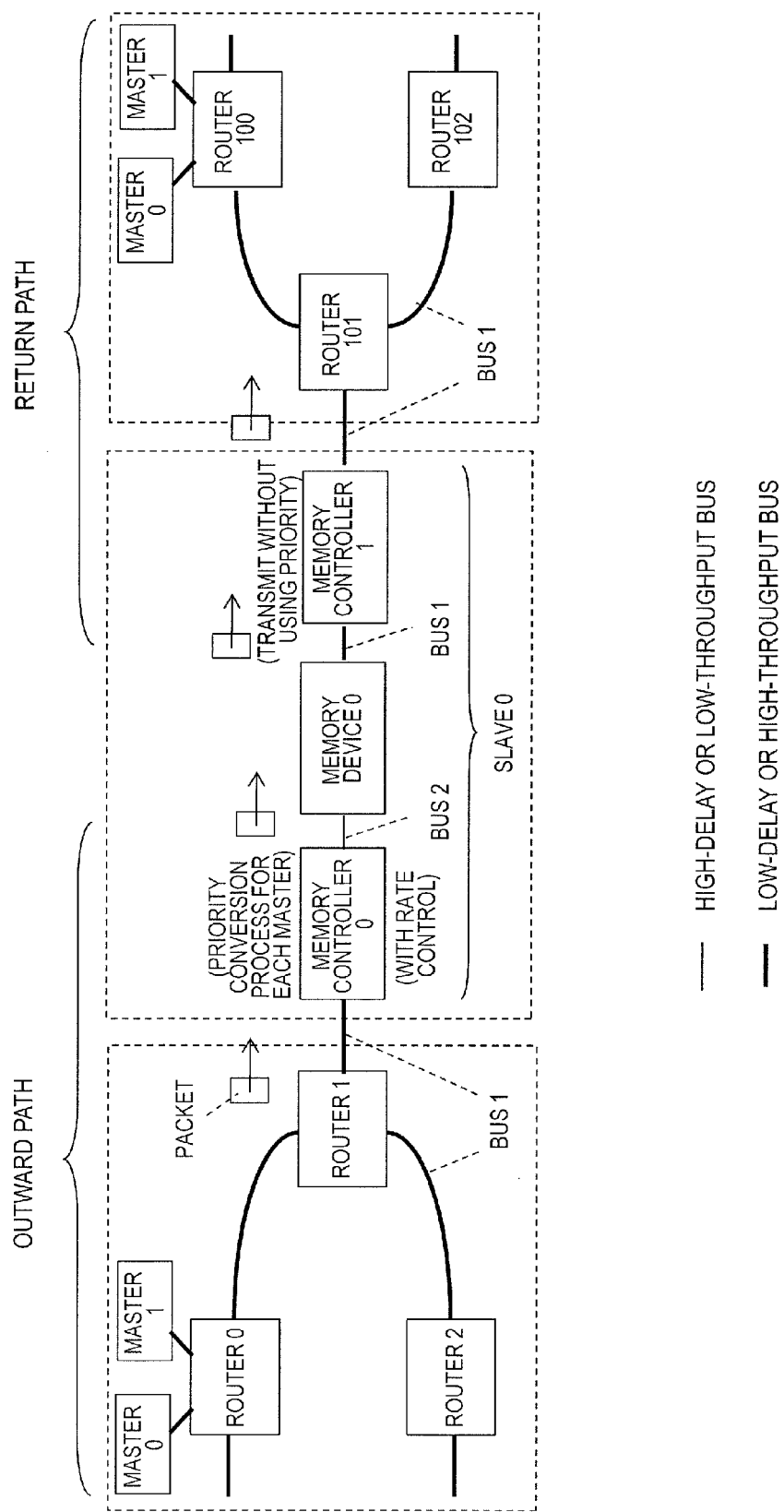
FIG. 37 shows an example configuration of a bus system according to an example embodiment.

FIG. 37 shows an example configuration of a bus system according to the present embodiment.

This bus system has an "outward path", on which an access request from a master to a memory device is transmitted from the master to a memory device of a slave, and a "return path", on which response data from the memory device for the access request is transmitted from the memory device to the master. Note that there may be a plurality of memory devices. For the outward path, the path between each master and a memory controller for performing the access process to the memory device is formed by a bus with a relatively low delay (e.g., the system bus or a local bus) and a node (Bus 1). On the other hand, since a memory device is a node with a high delay, the path from the memory controller to the memory device will have a relatively high delay (Bus 2). Similarly, for the return path, although the memory device has a high process delay, if the process delay of the memory controller or the router is lower than the process delay of the memory device, the path from the memory device to a master will have a relatively low delay (Bus 1).

For the outward path, the priority conversion process is performed by a memory controller that relays from a path with a relatively low delay (Bus 1) to a path with a high delay (Bus 2). For the return path, the priority is restored through the priority conversion process by a memory controller that relays from a path with a high delay (Bus 2) to a path with a low delay (Bus 1). Then, on the return path, if a sufficient bus band is ensured, and the processing capacity of the memory controller on the return path is as high as the processing capacity of a router, traffic flows are unlikely to be left remaining in the memory controller. Therefore, it is possible to simplify the implementation of the return path by performing the transmission substantially without using a priority by handling different packets with the same priority. Specifically, by transmitting packets without attaching priorities (the class and the deadline time) thereto, it is possible to reduce the amount of data exchanged, and to reduce comparison circuits required for priority comparing processes for relay devices including memory controllers.

Note that the priority conversion rule on the outward path may be a table representing the correspondence between master IDs and converted priorities in the embodiment described above, or may be a table representing the correspondence between buffer IDs, rather than master IDs, and converted priorities, where the memory controller includes a corresponding buffer for each master.

Figure 38:
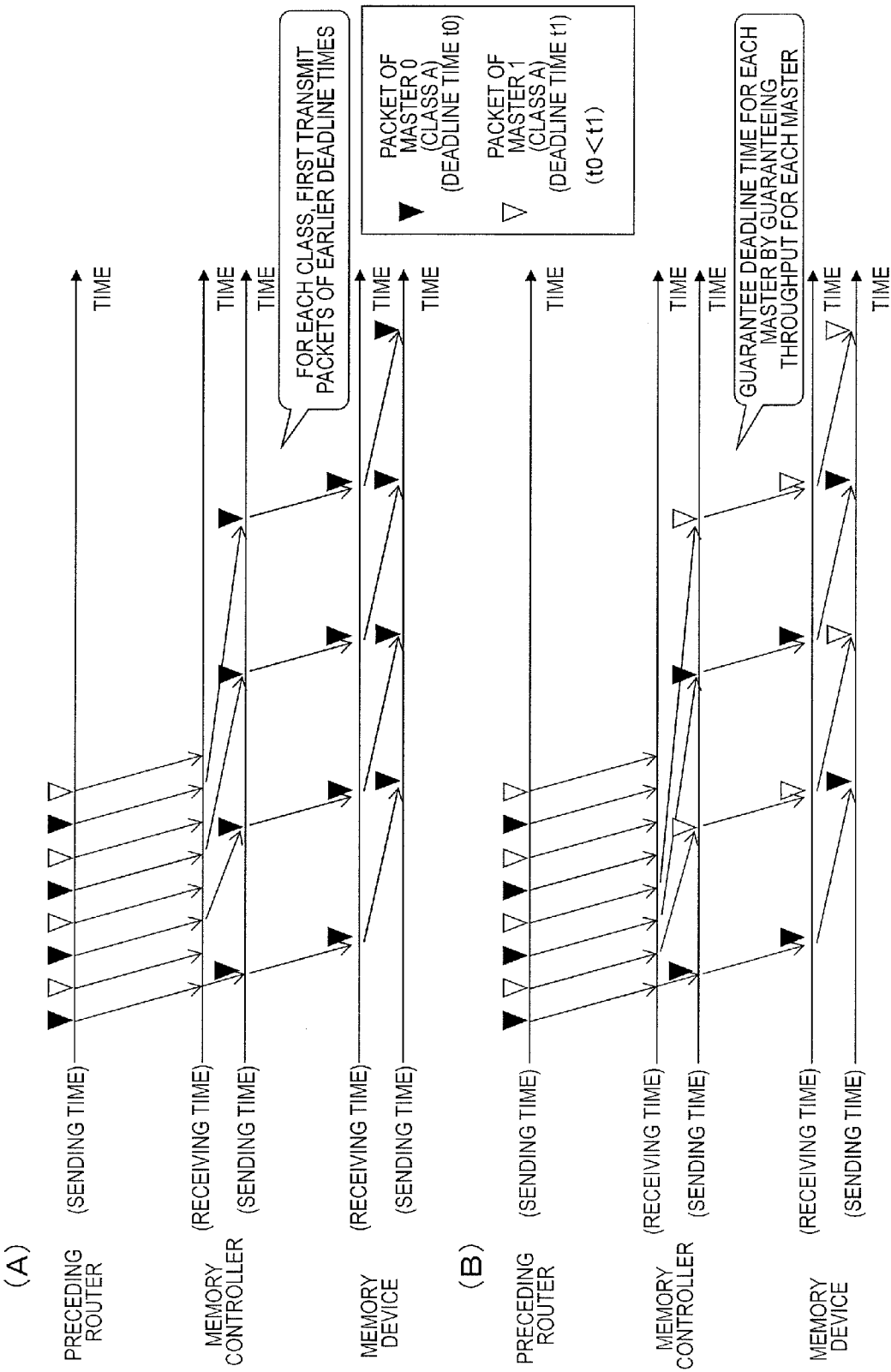
FIG. 38 shows differences between where the priority conversion is not performed and where it is performed in the memory controller.

FIGS. 38(A) and 38(B) of show the difference between a case where the priority conversion is performed by the memory controller and a case where the priority conversion is not performed by the memory controller.

FIGS. 38(A) and 38(B) show, for these cases, the sending time and the receiving time of each packet at various nodes of a router, a memory controller and a memory device on the outward path. A plurality of packets sent from Master 0 of Class A and a plurality of packets sent from Master 1 of Class A are being transmitted. As for the deadline time of each packet, the deadline time of each packet sent from Master 0 is time t0 and the deadline time of each packet sent from Master 1 is time t1, wherein time t1 is greater than time t0. As for the converted priority, Master 0 has a higher priority than Master 1.

In the case of FIG. 38(A), where the priority is not converted by the memory controller, since the priority order of transmission is determined by the class and the deadline time, packets from Master 0 with an earlier deadline time are transmitted earlier in a preferential manner. Since this results in a sending scheduling based on the class and the deadline time, there is a possibility that it is no longer possible to guarantee the throughput to be guaranteed for each master. On the other hand, in the case of FIG. 38(B) where the priority is converted, packets are transmitted, from among a plurality of packets that have arrived at the memory controller, in a descending order of the converted priority, while controlling the sending rate for each master. Thus, by guaranteeing the throughput for each master, it is possible to guarantee the deadline time for each master.

Figure 39:
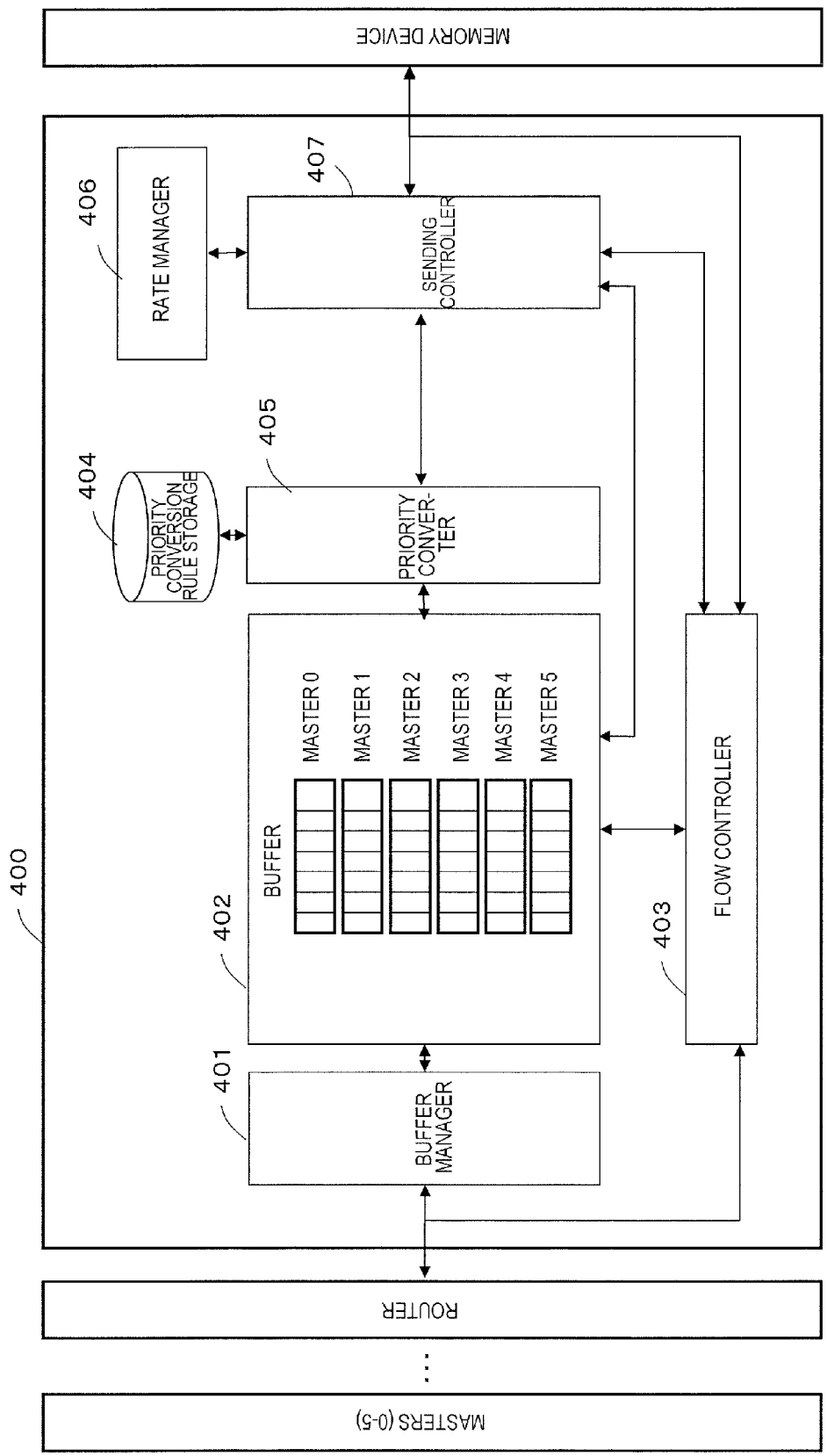
FIG. 39 shows a configuration of a memory controller 400 on the outward path.

FIG. 39 shows a configuration of a memory controller 400 on the outward path.

The memory controller 400 includes: a buffer manager 401 for identifying the master ID of the received packet to store the packet in a corresponding buffer for each master; a buffer 402 for storing a received packet separately for each master; a flow controller 403 for checking the vacancy of the destination memory device and notifying the sender relay device of the vacant buffer ID of the buffer 402; a priority conversion rule storage 404 for storing a priority conversion rule for converting the priority for each master; a priority converter 405 for identifying the master ID of each packet and converting the priority based on the identified master ID and the priority conversion rule; a rate manager 406 for managing the data sending rate for each master; and a sending controller 407 for controlling sending of data of the packet stored in the buffer 402 based on the sending rate managed by the rate manager 406 and the priority having been converted by the priority converter 405. Note that buffers does not need to be physically separated from one another for different masters, but a single buffer may be logically divided into separate portions. Since a memory controller on the return path can be implemented with a configuration where there is no distinction of destination and priority, as described above, it has a configuration (not shown) including a buffer for storing response data sent from a memory device, the flow controller 403 for obtaining a vacant buffer ID of the destination relay device, and a sending controller for sending response data stored in the buffer depending on the presence/absence of the vacant buffer ID of the destination.

Figure 40:
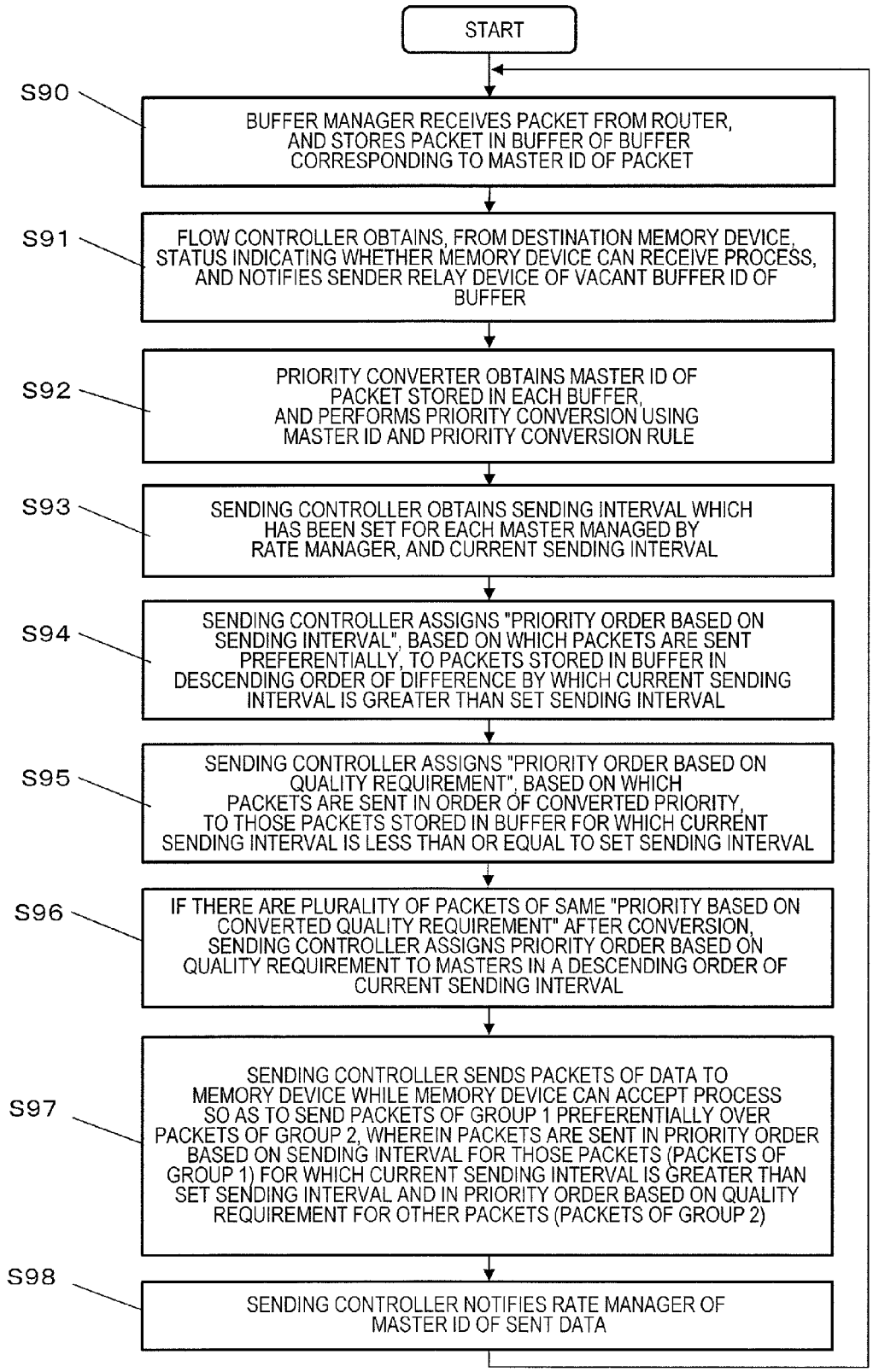
FIG. 40 is a flow chart showing an operation procedure of the memory controller 400.

FIG. 40 shows an operation flow of the memory controller 400.

The buffer manager receives a packet from a router, and stores the packet in a buffer of the buffer corresponding to the master ID of the packet (S90). The flow controller 403 obtains, from the destination memory device, the status indicating whether the memory device can accept a process, and notifies the sender relay device of the vacant buffer ID of the buffer (S91). The priority converter obtains the master ID of the packet stored in each buffer, and performs the priority conversion using the master ID and the priority conversion rule (S92). The sending controller obtains the sending interval which has been set for each master managed by the rate manager, and the current sending interval (S93). The sending controller assigns "the priority order based on the sending interval" to packets stored in the buffer in a descending order of the difference value obtained by subtracting the set sending interval from the current sending interval (the amount of time elapsed from the time of the last transmission) (S94). The sending controller assigns the "priority order based on the quality requirement" to packets stored in the buffer in a descending order of the converted priority (S95). If there are a plurality of packets of the same priority based on the converted quality requirement, the priority order based on the quality requirement is assigned to masters in a descending order of the current sending interval (the amount of time elapsed from the time of the last transmission) so that the sending rate is even among masters (e.g., so that the sending rate value is equal among all masters or falls within a predetermined range (e.g., within 5%)) (S96). The sending controller sends packets of data to the memory device while the memory device has vacancy so as to send packets of Group 1 preferentially over packets of Group 2, wherein the packets are sent in the priority order based on the sending interval for those packets (packets of Group 1) for which the current sending interval is greater than the set sending interval and in the priority order based on the quality requirement for the other packets (packets of Group 2) (S97). The sending controller notifies the rate manager of the master ID of sent data (S98).

FIG. 41 shows a priority conversion rule stored in the priority conversion rule storage 404. The priority conversion rule of the present embodiment is implemented as a table including the converted class for each master ID. For example, by using this rule, the packet whose master ID is Master 0 is converted, from Class A, to Class A of the same priority. The packet of Master 1 is converted from Class A, which is the same class as Master 0, to Class B of a lower priority than Class A. The packets of Master 4 and Master 5 are converted, from Class C, to Class E, the lowest priority among all the converted classes.

FIG. 42 shows the sending rate for each master managed by the rate manager 406.

In the present embodiment, the sending rate is controlled based on the sending interval for sending data. Note that the sending rate may also be controlled based on the amount of data which is sent per unit time, rather than the sending interval. Where the control is based on the sending interval, for example, the designer sets, in advance, the sending interval for each master in the rate manager, and the rate manager manages the current sending interval (the amount of time elapsed from the time of the last transmission), based on the packet sending timing, using a counter whose counter value becomes "0" when a packet is sent and which counts up while the packet waits to be sent. Specifically, as shown in FIG. 42, for Master 0, the set sending interval is 10 (cycles) and the current counter value is 2 (cycles). For Master 1, the set sending interval is 10 (cycles) and the current counter value is 12 (cycles). The sending controller assigns packets for which the current counter value is greater than the set sending interval with "priority order based on sending interval" so that packets of greater differences therebetween are assigned higher priorities (Group 1). For Master 2, the set sending interval is 100 (cycles) and the current counter value is 25 (cycles). Packets for which the current counter value is smaller than the set sending interval are assigned with "priority order based on quality requirement" so that packets of higher converted class priorities are assigned higher priorities (Group 2). Moreover, where there are a plurality of masters assigned to the same priority class based on the converted quality requirement (e.g., Master 4 and Master 5) of Class E), the sending controller assigns higher priority orders based on the quality requirement for those having greater current counter values, for example, so that the sending rate will be even among masters. Alternatively, the amount of data that has been sent over a certain period of time, may be accumulated, and a higher priority order may be assigned to a master which has sent a smaller amount of data over a certain period of time immediately previously so that the amount of data sent over a certain period of time will be even among masters. For a master for which both of the throughput and the delay time are not guaranteed, the sending interval of the rate manager is set to "−1", and the lowest sending priority order can be assigned without calculating the difference between the counter value and the set sending interval.

For the example of FIGS. 41 and 42, for example, the sending controller assigns the highest priority order "1" (a smaller value means a higher priority) to Master 1 (Group 1) for which the sending control counter value is greater than the set sending interval. Then, Masters 0, 2 and 3, for which the sending control counter value is less than or equal to the set sending interval, are assigned priorities according to the priority order based on the quality requirement (Group 2), wherein Master 0 whose converted class is Class A is assigned a priority order "2", Master 2 of Class C is assigned a priority order "3", and Master 3 of Class D is assigned a priority order "4". Non-guaranteed Masters 4 and 5, for which both of the throughput and the delay time are not guaranteed, are assigned the lowest priority order, and since they share the same converted class, Class E, Master 5 of the greater counter value is assigned a priority order "5", and Master 6 is assigned priority order "6".

Thus, the sending controller sends a packet of the highest priority order to the memory device while guaranteeing the sending rate for each master by the set sending rate.

An embodiment of the present invention is directed to distributed buses in a semiconductor integrated circuit, wherein a plurality of setting variations are provided where buses have different levels of transmission performance and nodes have different level of process performance, thereby making it possible to combine semiconductor devices with one another to create a product, thus allowing for a reduction in the cost for developing semiconductor devices. Moreover, various ways of combination can be accommodated, thus facilitating the development of different models.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A bus system for a semiconductor circuit, in which data is transmitted on a networked bus between a first node and at least one second node via a relay device arranged on the bus, wherein:
    the bus system includes a first bus having a first delay and a second bus, different from the first bus, having a second delay, the second delay being larger than the first delay;
    the first node includes:
        a first buffer for storing data; and
        a packet generator circuit for generating a plurality of packets by attaching, to the data stored in the first buffer, information specifying a priority of transmission at the relay device, which is determined based on a transmission delay of a high-delay bus of a relatively large transmission delay; and
    the relay device includes:
        a priority converter circuit for converting a priority of each of the plurality of packets based on a predetermined priority conversion rule,
        a buffer allocator circuit for allocating a buffer of a destination relay device to which the packet is to be sent, based on a priority;
        a sending controller for sending packets in a descending order of the priority; and
        a second buffer for storing packets based on the priority; and
    wherein, the buffer allocator circuit allocates a buffer of a destination relay device to which the packet is to be sent, based on the converted priority, and
    the priority is determined by at least one of a class representing a rigidness of a quality requirement and a deadline time representing an acceptable delay of the quality requirement, wherein for a packet to be transmitted via the bus having the second delay, the priority converter circuit converts the priority so that the priority becomes higher, and wherein for a packet not to be transmitted via the bus having the second delay, the priority converter circuit converts the priority so that the priority becomes lower.

2. The bus system of claim 1, wherein:

where the priority is determined by the deadline time representing the acceptable delay of the quality requirement, the priority converter circuit converts the priority so that the deadline time becomes shorter for a certain period of time for each second bus having the second delay through which a packet passes.

3. The bus system of claim 1, wherein the second buffer separately stores a packet to be transmitted via the bus having the second delay and a packet to be transmitted via the bus having the first delay.

4. The bus system of claim 1, wherein where the priority is determined by the deadline time representing the acceptable delay of the quality requirement, the sending controller sends packets in an ascending order of the deadline time.

5. The bus system of claim 1, wherein the class representing the rigidness of the quality requirement is defined by at least one of a throughput and an acceptable delay time required by a predetermined node on the bus.

6. The bus system of claim 1, wherein:

where the priority is determined by the class representing the rigidness of the quality requirement, the second buffer of the relay device sets the number of buffers for a class of a low priority to be smaller than the number of buffers for a class of a high priority.

7. The bus system of claim 1, wherein:

the bus includes a high-delay bus having a third transmission delay; and the transmission delay is determined based on at least one of a wiring length, the number of repeaters, a transmission material, a transmission error rate on a transmission path, and the number of resends on the transmission path.

8. The bus system of claim 1, wherein:

at least two bus systems are connected to each other by two different transmission paths;

the first node and the at least one second node are present on each of the different bus systems;

the two transmission paths are used as an outward path and a return path for packets;

the outward path is provided with an outward-path relay device for relaying packets;

the return path is provided with a return-path relay device for relaying packets;

the outward-path relay device at least relays packets transmitted from the first node to the at least one second node, and the return-path relay device at least relays packets transmitted from the at least one second node to the first node; and the outward-path relay device and the return-path relay device are connected to each other.

9. A non-transitory computer readable medium storing a computer program which is executed by a computer for calculating a priority of transmission to be set in a bus system for a semiconductor circuit, in which a plurality of data are transmitted on a networked bus between a first node and at least one second node via a relay device arranged on the bus, wherein:

the bus system includes a first bus having a first delay and a second bus, different from the first bus, having a second delay, the second delay being longer than the first delay;

the computer program causes the computer to execute:

a step of receiving a priority conversion rule for converting a priority to a priority determined based on a transmission delay of the second bus, and an input of information of a predetermined priority; and a step of calculating a priority of transmission at the relay device based on the predetermined priority and the priority conversion rule, wherein for a packet to be transmitted via the bus having the second delay, the priority conversion rule converts the priority so that the priority becomes higher, and wherein for a packet not to be transmitted via the bus having the second delay, the priority conversion rule converts the priority so that the priority becomes lower.

10. A bus system for a semiconductor circuit, in which data is transmitted on a networked bus between a first node and a second node via at least one relay device arranged on the bus, wherein:

the second node has a processing capacity relatively lower than the relay device;

the first node and the relay device are connected together via a first bus;

the relay device and the second node are connected together via a second bus;

a first classification is defined on the first bus whereby packets are processed by the unit of classes each representing a rigidness of a quality requirement, whereas a second classification is defined on the second bus whereby packets are processed by the unit of the first node;

the first node includes:

a first buffer for storing the data; and a packet generator circuit for generating a plurality of packets by attaching, to the data stored in the buffer, a class specifying a priority of transmission at the relay device; and the relay device includes:

a buffer manager circuit for receiving the plurality of packets via the first bus;

a second buffer for storing the received packets;

a priority converter circuit for performing a priority process of identifying a first node of a sender of the plurality of packets and converting from the packet process by the unit of classes to the packet process by the unit of the first node; and a sending controller for sending the data via the second bus in a descending order of the converted priority, which indicates the order in which packets are sent.

11. The bus system of claim 10, wherein the first relay device further includes:

a rate manager for storing a sending rate for each first node; and a sending controller for assigning, to a plurality of packets stored in the first buffer, a first priority order based on a sending rate set in the rate manager and a second priority order based on the priority of class which has been converted to the unit of the first node, wherein the data is sent by preferentially using the first priority order.

12. The bus system of claim 10, wherein the first relay device further includes a flow controller for obtaining a status indicating whether the data can be received from the second node of a destination.

13. The bus system of claim 10, wherein the first relay device further includes a sending controller for performing a sending process so that a sending rate is even between a plurality of first nodes of the same priority, in a case where priorities of converted classes are equal to one another.

14. A bus system for a semiconductor circuit, in which data is transmitted on a networked bus between a first node and a second node via a plurality of relay devices arranged on the bus, wherein:
   the second node has a processing capacity relatively lower than the relay device;
   the bus system includes an outward path and a return path, independent of each other, as paths along which packets are transmitted;
   the first node and the relay device are connected together via a first bus of the outward path;
   the relay device and the second node are connected together via a second bus of the outward path;
   a first classification is defined on the first bus whereby packets are processed by the unit of classes each representing a rigidness of a quality requirement, whereas a second classification is defined on the second bus whereby packets are processed by the unit of the first node;
   a first relay device is arranged between the first bus and the second bus;
   the first relay device includes:
      a buffer manager circuit for receiving the plurality of packets via the first bus;
      a first buffer for storing the received packets;
      a priority converter circuit for performing a priority process of identifying a first node of a sender of the plurality of packets and converting from the packet process by the unit of classes to the packet process by the unit of the first node; and
      a sending controller for sending the data via the second bus in a descending order of the converted priority, which indicates the order in which packets are sent;
   a second relay device is arranged on the return path; and
   the second relay device transmits a plurality of packets from the second node to the first node without distinguishing between priorities of transmission of the plurality of packets.

15. The bus system of claim 14, wherein the first relay device further includes:
   a rate manager circuit for storing a sending rate for each first node; and
   a sending controller for assigning, to a plurality of packets stored in the first buffer, a first priority order based on a sending rate set in the rate manager circuit and a second priority order based on the priority of class which has been converted to the unit of the first node, wherein the data is sent by preferentially using the first priority order.

16. The bus system of claim 14, wherein the first relay device further includes a flow controller for obtaining a status indicating whether the data can be received from the second node of a destination.

17. The bus system of claim 14, wherein the first relay device further includes a sending controller for performing a sending process so that a sending rate is even between a plurality of first nodes of the same priority, in a case where priorities of converted classes are equal to one another.

* * * * *